US012313263B2

(12) United States Patent
Tokuyama et al.

(10) Patent No.: US 12,313,263 B2
(45) Date of Patent: May 27, 2025

(54) GAS TURBINE COMBUSTOR, GAS TURBINE, AND GAS TURBINE ASSEMBLING METHOD

(71) Applicant: MITSUBISHI HEAVY INDUSTRIES, LTD., Tokyo (JP)

(72) Inventors: Kentaro Tokuyama, Kanagawa (JP); Taiki Kinoshita, Kanagawa (JP); Kenta Taniguchi, Kanagawa (JP); Kenichi Hashimoto, Kanagawa (JP); Satoshi Takiguchi, Tokyo (JP); Kazuhiro Tominaga, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/278,697

(22) PCT Filed: Mar. 16, 2022

(86) PCT No.: PCT/JP2022/011809
§ 371 (c)(1),
(2) Date: Aug. 24, 2023

(87) PCT Pub. No.: WO2022/202516
PCT Pub. Date: Sep. 29, 2022

(65) Prior Publication Data

US 2025/0093034 A1 Mar. 20, 2025

(30) Foreign Application Priority Data

Mar. 24, 2021 (JP) ................................ 2021-049675

(51) Int. Cl.
*F23R 3/46* (2006.01)
*F23R 3/00* (2006.01)

(52) U.S. Cl.
CPC ................ *F23R 3/46* (2013.01); *F23R 3/002* (2013.01); *F05D 2240/35* (2013.01); *F05D 2260/963* (2013.01); *F23R 2900/00014* (2013.01)

(58) Field of Classification Search
CPC .. F23R 3/46; F23R 3/002; F23R 2900/00014; F05D 2260/963
See application file for complete search history.

(56) References Cited

U.S. PATENT DOCUMENTS 7,080,514 B2 * 7/2006 Bland .................. F23M 20/005 60/725
7,832,211 B2 * 11/2010 Ikeda ........................ F23R 3/04 60/725

(Continued)

FOREIGN PATENT DOCUMENTS

JP 2006-29677 2/2006
JP 2013-117231 6/2013

(Continued)

OTHER PUBLICATIONS

International Search Report issued May 24, 2022 in International Application No. PCT/JP2022/011809.

*Primary Examiner* — Lorne E Meade
(74) *Attorney, Agent, or Firm* — Wenderoth, Lind & Ponack, L.L.P.

(57) ABSTRACT

An acoustic device for a gas turbine combustor includes: a first region positioned at a downstream side of a combustion cylinder, the first region existing at a position which is at least one of a pair of positions across the combustion cylinder in a radial direction of the combustion cylinder; a pair of second regions whose axial-direction position with respect to the combustion cylinder overlaps at least partially with the pair of positions, and whose circumferential-direction position with respect to the combustion cylinder is (Continued)

different from that of the pair of positions, the pair of second regions existing at positions across the combustion cylinder in the radial direction; and a third region positioned at an upstream side of the first region and the second region with respect to the combustion cylinder.

22 Claims, 11 Drawing Sheets

(56) References Cited

U.S. PATENT DOCUMENTS

| | | | | |
|---|---|---|---|---|
| 8,490,744 | B2 * | 7/2013 | Nakamura | F23R 3/06 244/1 N |
| 8,733,496 | B2 * | 5/2014 | Ono | F23R 3/06 181/213 |
| 8,789,372 | B2 * | 7/2014 | Johnson | F23R 3/28 60/725 |
| 9,410,484 | B2 * | 8/2016 | Schilp | F02C 7/12 |
| 9,816,440 | B2 * | 11/2017 | Ito | F23R 3/26 |
| 10,508,602 | B2 | 12/2019 | Barton et al. | |
| 10,546,070 | B2 * | 1/2020 | Hellat | G06F 30/00 |
| 10,712,004 | B2 * | 7/2020 | Kugimiya | F23R 3/42 |
| 10,844,792 | B2 * | 11/2020 | Kugimiya | F01D 25/00 |
| 11,840,963 | B2 * | 12/2023 | Shiraishi | F02C 7/24 |
| 11,852,343 | B2 * | 12/2023 | Akamatsu | G10K 11/16 |
| 2011/0220433 | A1 | 9/2011 | Nakamura et al. | |
| 2012/0204534 | A1 * | 8/2012 | Kenyon | F23R 7/00 60/249 |
| 2013/0206500 | A1 | 8/2013 | Ono et al. | |

FOREIGN PATENT DOCUMENTS

| | | |
|---|---|---|
| JP | 2014-206350 | 10/2014 |
| JP | 2014-238099 | 12/2014 |
| JP | 2017-20682 | 1/2017 |
| JP | 2018-59502 | 4/2018 |

* cited by examiner

C-C

GAS TURBINE COMBUSTOR, GAS TURBINE, AND GAS TURBINE ASSEMBLING METHOD

TECHNICAL FIELD

The present disclosure relates to a gas turbine combustor, a gas turbine, and a gas turbine assembling method. The present application claims priority based on Japanese Patent Application No. 2021-049675 filed on Mar. 24, 2021 with the Japanese Patent Office, the contents of which are incorporated herein by reference.

BACKGROUND ART

A gas turbine includes a compressor, a combustor, and a turbine. The compressor takes in air, compress and pressurizes the air to a high pressure, and sends the high pressure air to the combustor.

The combustor injects a fuel to the high-pressure air and combusts the fuel. The high-temperature combustion gas produced through combustion of the fuel is sent to the turbine, and the high-temperature combustion gas drives the turbine.

The turbine and the compressor rotate around the same rotational shaft. Thus, when the turbine is driven as described above, the compressor is also driven, taking in and compressing air as described above.

In a gas turbine that operates as described above, combustion oscillation may occur when the fuel combusts, which may cause noise and oscillation during operation of the gas turbine.

Thus, to suppress the noise and oscillation due to the combustion oscillation, the combustor is provided with an acoustic liner for absorbing relatively high-frequency sound which includes a perforated plate and a cover that covers the outer side of the perforated plate, for instance, and an acoustic damper for absorbing relatively low-frequency sound which has a large resonance space (see Patent Document 1 for instance).

CITATION LIST

Patent Literature

Patent Document 1: JP2013-117231A

SUMMARY

Problems to be Solved

Generally, in an industrial gas turbine, a plurality of gas turbine combustors are arranged along the circumferential direction of the gas turbine. Furthermore, due to the relationship between the turbine rotor blades and the combustor with respect to the position in the radial direction of the gas turbine, the plurality of combustors are disposed close to the radially inner side of the gas turbine. Thus, the distance between adjacent combustors in the circumferential direction of the gas turbine tends to be relatively small.

When it is less easy for the compressed air from the combustor to pass through the space between adjacent combustors in the circumferential direction of the gas turbine, the flow of compressed air flowing into the combustors may become more unevenly distributed with respect to the position in the circumferential direction of the combustor. Thus, the flame temperature may increase locally inside the combustion cylinder, for instance, which may lead to an increase in combustion oscillation, an increase in Nox, or the like.

An object of at least one embodiment of the present disclosure is to suppress uneven distribution of the flow of compressed air flowing into the combustion cylinder with respect to the position in the circumferential direction of the combustion cylinder.

Solution to the Problems (1) According to at least one embodiment of the present disclosure, a combustor for a gas turbine includes: a combustion cylinder; and an acoustic device disposed on an outer circumference of the combustion cylinder, and the acoustic device includes: a first region positioned at a downstream side of the combustion cylinder, the first region existing at a position which is at least one of a pair of positions across the combustion cylinder in a radial direction of the combustion cylinder; a pair of second regions whose axial-direction position with respect to the combustion cylinder overlaps at least partially with the pair of positions, and whose circumferential-direction position with respect to the combustion cylinder is different from that of the pair of positions, the pair of second regions existing at positions across the combustion cylinder in the radial direction; and a third region positioned at an upstream side of the first region and the second region with respect to the combustion cylinder. A thickness of the acoustic device in the radial direction in the pair of second regions is smaller than a thickness of the acoustic device in the radial direction in the first region, and a thickness of the acoustic device in the radial direction in the third region is greater than a thickness of the acoustic device in the radial direction in the pair of second regions.

(2) According to at least one embodiment of the present disclosure, the gas turbine includes a plurality of the gas turbine combustors according to the above configuration (1), the plurality of gas turbine combustors are arranged in a circumferential direction of the gas turbine, and two of the gas turbine combustors which are adjacent in the circumferential direction of the gas turbine are arranged such that a region of the pair of second regions of one of the two gas turbine combustors is adjacent to the other region of the pair of second regions of the other one of the two gas turbine combustors in the circumferential direction of the gas turbine.

(3) According to at least one embodiment of the present disclosure, a method of assembling a gas turbine is a method of assembling a gas turbine including: a step of arranging a plurality of the gas turbine combustors having the above configuration (1) inside a casing of the gas turbine in a circumferential direction of the gas turbine, and the step of arranging includes arranging the plurality of gas turbine combustors such that, among two of the gas turbine combustors which are adjacent to one another in the circumferential direction of the gas turbine, a region of the pair of second regions of one of the gas turbine combustors and the other region of the pair of second regions of the other one of the gas turbine combustors are adjacent to one another in the circumferential direction of the gas turbine.

Advantageous Effects

According to at least one embodiment of the present disclosure, it is possible to suppress uneven distribution of the flow of compressed air flowing into the combustion cylinder with respect to the position in the circumferential direction of the combustion cylinder.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as “in a direction”, “along a direction”, “parallel”, “orthogonal”, “centered”, “concentric” and “coaxial” shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as “same” “equal” and “uniform” shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as “comprise”, “include”, “have”, “contain” and “constitute” are not intended to be exclusive of other components.

(Gas Turbine 1)

Figure 1:
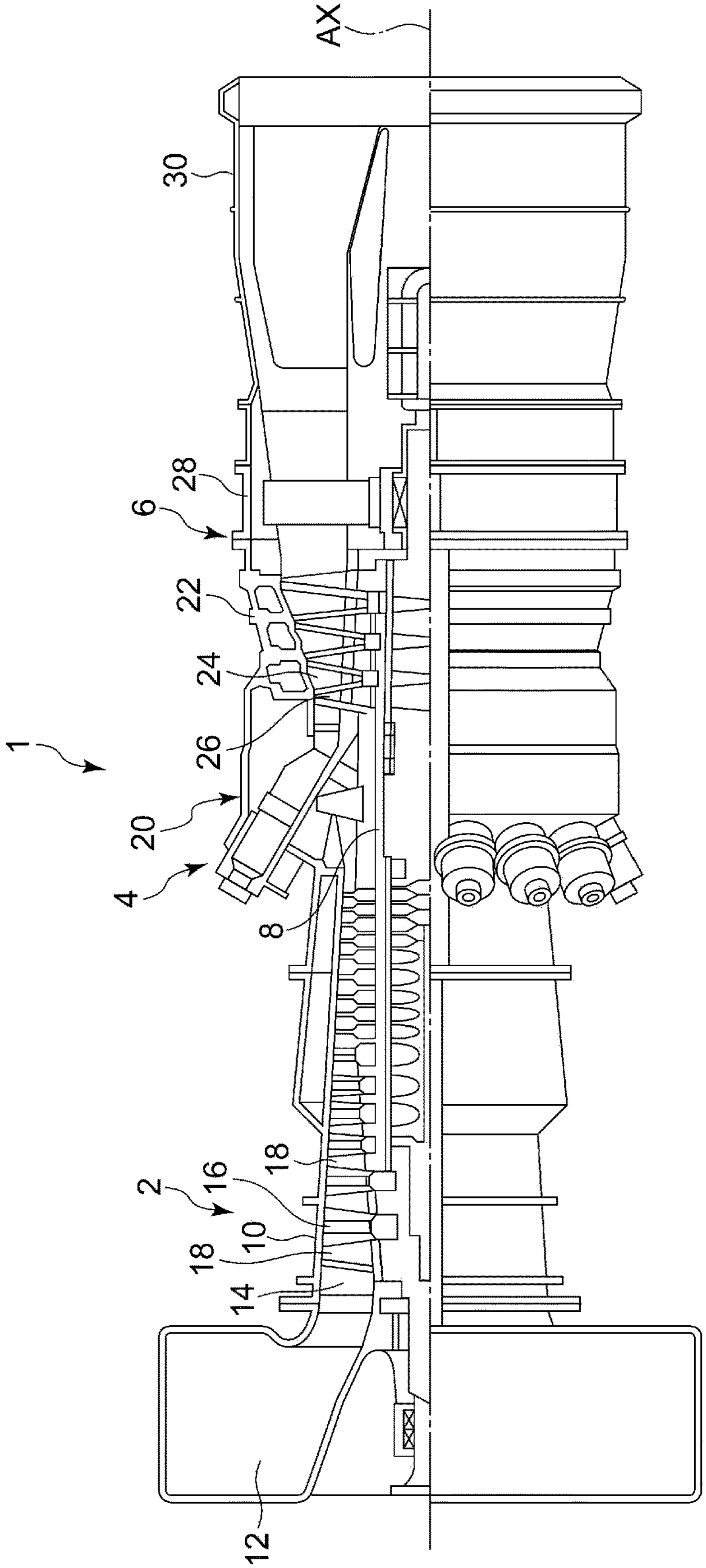
FIG. 1 is a schematic configuration diagram of a gas turbine according to some embodiments.

FIG. 1 is a schematic configuration diagram of a gas turbine according to some embodiments.

A gas turbine, which is an example of application of a gas turbine combustor according to some embodiments, will be described with reference to FIG. 1.

As illustrated in FIG. 1, the gas turbine 1 according to some embodiments includes a compressor 2 for producing compressed air that serves as an oxidant, a gas turbine combustor 4 for producing combustion gas using the compressed air and a fuel, and a turbine 6 configured to be driven by the combustion gas to rotate. In the case of the gas turbine 1 for power generation, a generator (not illustrated) is connected to the turbine 6, so that electric power is generated using rotational energy of the turbine 6. In the following description, the gas turbine combustor 4 will be also referred to as merely the combustor 4.

A specific configuration example of each component of the gas turbine 1 according to some embodiments will be described.

The compressor 2 according to some embodiments includes a compressor casing 10, an air inlet 12 for taking in air, disposed on an inlet side of the compressor casing 10, a rotor 8 disposed so as to penetrate through both of the compressor casing 10 and the turbine casing 22 described below, and a variety of vanes disposed inside the compressor casing 10. The variety of vanes includes an inlet guide vane 14 disposed at the side of the air inlet 12, a plurality of stator vanes 16 fixed to the compressor casing 10, and a plurality of rotor blades 18 implanted on the rotor 8 so as to be arranged alternately with the stator vanes 16. The compressor 2 may include other constituent elements not illustrated in the drawings, such as an extraction chamber. In the above compressor 2, the air taken in from the air inlet 12 passes through the plurality of stator vanes 16 and the plurality of rotor blades 18 to be compressed and become compressed air having a high temperature and a high pressure. The compressed air having a high temperature and a high pressure is sent to the combustor 4 of a latter stage from the compressor 2.

The combustor 4 according to some embodiments is disposed in a casing 20. As illustrated in FIG. 1, a plurality of combustors 4 are disposed in an annular shape centered at the rotor 8 inside the casing 20. The combustor 4 is supplied with a fuel and the compressed air produced by the compressor 2, and combusts the fuel and the compressed air to produce combustion gas that serves as a working fluid of the turbine 6. The combustion gas is sent to the turbine 6 at a latter stage from the combustor 4. The configuration example of the combustor 4 according to some embodiments will be described later in detail.

The turbine 6 according to some embodiments includes a turbine casing 22 and a variety of vanes disposed inside the turbine casing 22. The variety of vanes includes a plurality of stator vanes 24 fixed to the turbine casing 22 and a plurality of rotor blades 26 implanted on the rotor 8 so as to be arranged alternately with the stator vanes 24. The turbine 6 may include other constituent elements, such as outlet guide vanes and the like. In the turbine 6, the rotor 8 is driven to rotate as the combustion gas passes through the plurality of stator vanes 24 and the plurality of rotor blades 26. In this way, the generator coupled to the rotor 8 is driven.

An exhaust chamber 30 is connected to the downstream side of the turbine casing 22 via an exhaust casing 28. The combustion gas after driving the turbine 6 is discharged outside via the exhaust casing 28 and the exhaust chamber 30.

(Combustor 4)

Figure 2:
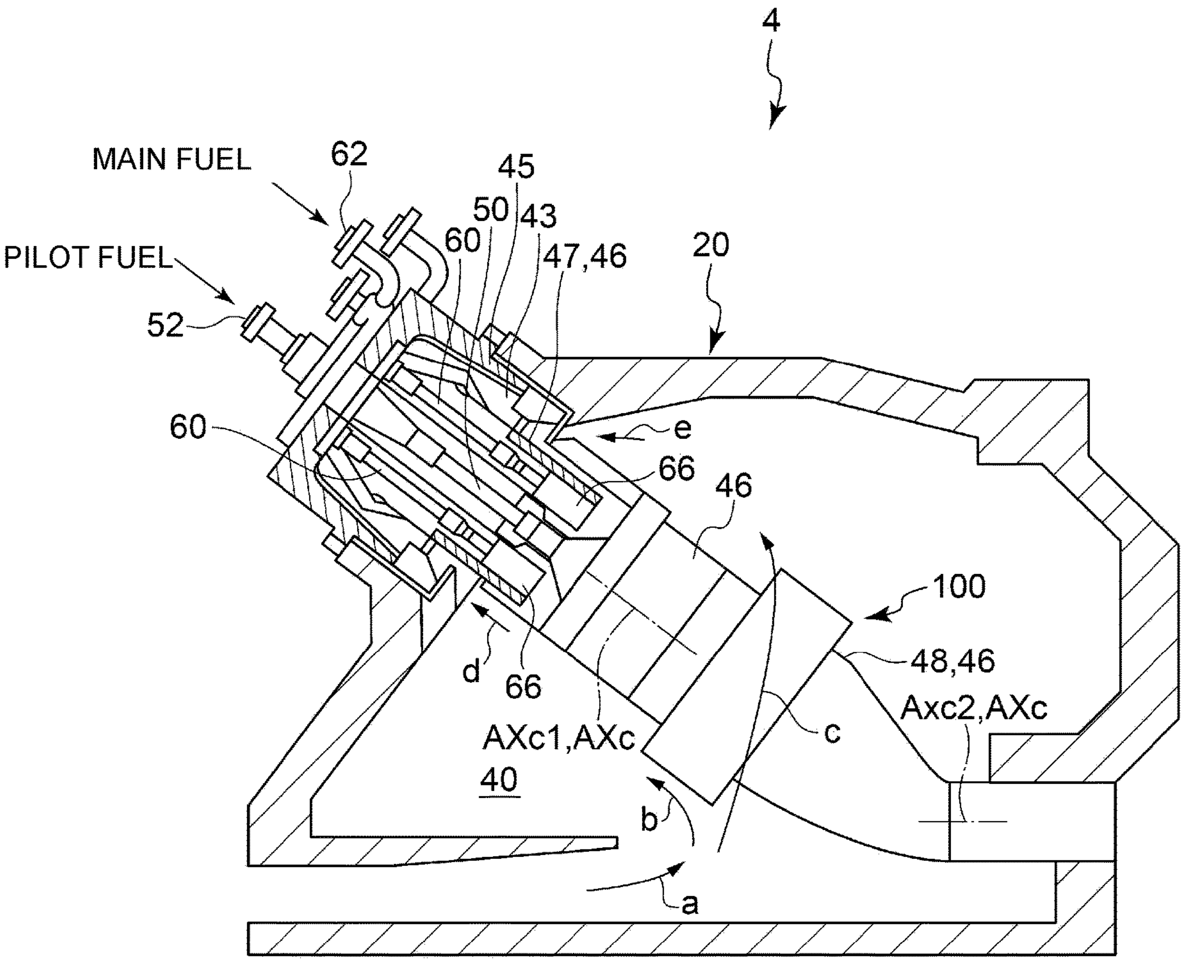
FIG. 2 is a cross-sectional view of a combustor according to some embodiments.

FIG. 2 is a cross-sectional view of a combustor according to some embodiments.

With reference to FIG. 2, the specific configuration of the combustor 4 according to some embodiments will be described.

As depicted in FIG. 2, a plurality of combustors 4 according to some embodiments are disposed in an annular shape centered at the rotor 8 (see FIG. 1). Each combustor 4 includes a combustor liner 46 disposed in a combustor casing 40 defined by the casing 20, a pilot combustion burner 50 disposed in the combustor liner 46, and a plurality of premix combustion burners (main combustion burners) 60 disposed in the combustor liner 46. The combustor 4 further includes a cylinder casing 45 disposed at the radially outer side of the combustor basket 47 of the combustor liner 46 inside the casing 20. At the radially outer side of the combustor basket 47 and the radially inner side of the cylinder casing 45, an air passage 43 through which compressed air flows is formed.

The combustor 4 may include other constituent elements such as a bypass pipe (not illustrated) for allowing the combustion gas to bypass.

For instance, the combustor liner 46 includes a combustor basket 47 disposed around the pilot combustion burner 50 and the plurality of premix combustion burners 60, and a transition piece 48 connected to a distal end of the combustor basket 47. The combustor basket 47 and the transition piece 48 may form an integrated combustor liner. In the following description, the combustor liner 46 will be also referred to as the combustion cylinder 46, including a case where the combustor basket 47 and the transition piece 48 constitute an integral combustion cylinder.

The pilot combustion burner 50 is disposed along the center axis AXc of the combustion cylinder 46. The plurality of premix combustion burners 60 are arranged at intervals from one another so as to surround the pilot combustion burner 50.

In the combustor 4 having the above configuration, the compressed air having a high temperature and a high pressure produced in the compressor 2 is supplied to the combustor casing 40 from a compressor outlet, and then flows into the burner cylinder 66 from the combustor casing 40 via the air passage 43. The compressed air and a fuel supplied from the fuel port 62 are premixed in the burner cylinder 66. At this time, the premixed gas mainly forms a swirl flow with a swirler (not depicted), and flows into the combustion cylinder 46. Further, the compressed air and a fuel injected from the pilot combustion burner 50 via the fuel port 52 are mixed in the combustion cylinder 46, and ignited by a pilot light (not illustrated) to be combusted, thereby generating combustion gas. At this time, a part of the combustion gas diffuses to the surroundings with flames, which ignites the premixed gas flowing into the combustion cylinder 46 from each premix combustion burner 60 to cause combustion. Specifically, with the pilot flame produced by the pilot fuel injected from the pilot combustion burner 50, it is possible to hold flames for performing stable combustion of premixed gas (premixed fuel-gas mixture) from the premix combustion burner 60.

(Acoustic Device 100)

Figure 3:
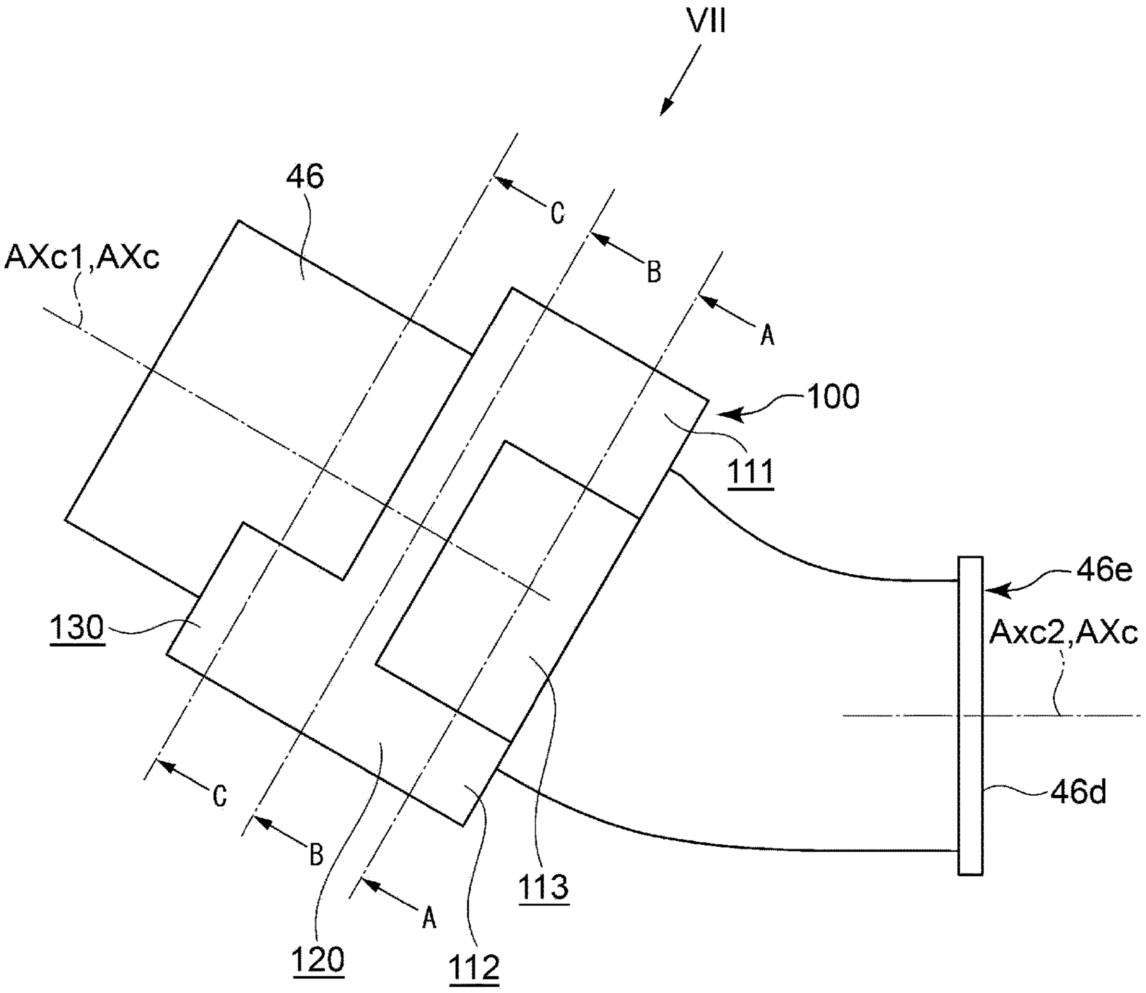
FIG. 3 is a schematic side view of a combustor according to some embodiments as seen in the circumferential direction of the gas turbine centered at the center axis of the gas turbine.

FIG. 3 is a schematic side view of a combustor 4 according to some embodiments as seen in the circumferential direction of the gas turbine 1 centered at the center axis of the rotor 8, that is, the center axis AX of the gas turbine 1. In FIG. 3, the center axis AX of the gas turbine 1 extends in the right-left direction in the drawing at the lower part of the combustor 4 in the drawing.

The combustor 4 according to some embodiments includes an acoustic device 100 disposed on the outer circumference of the combustion cylinder 46.

Figure 4A:
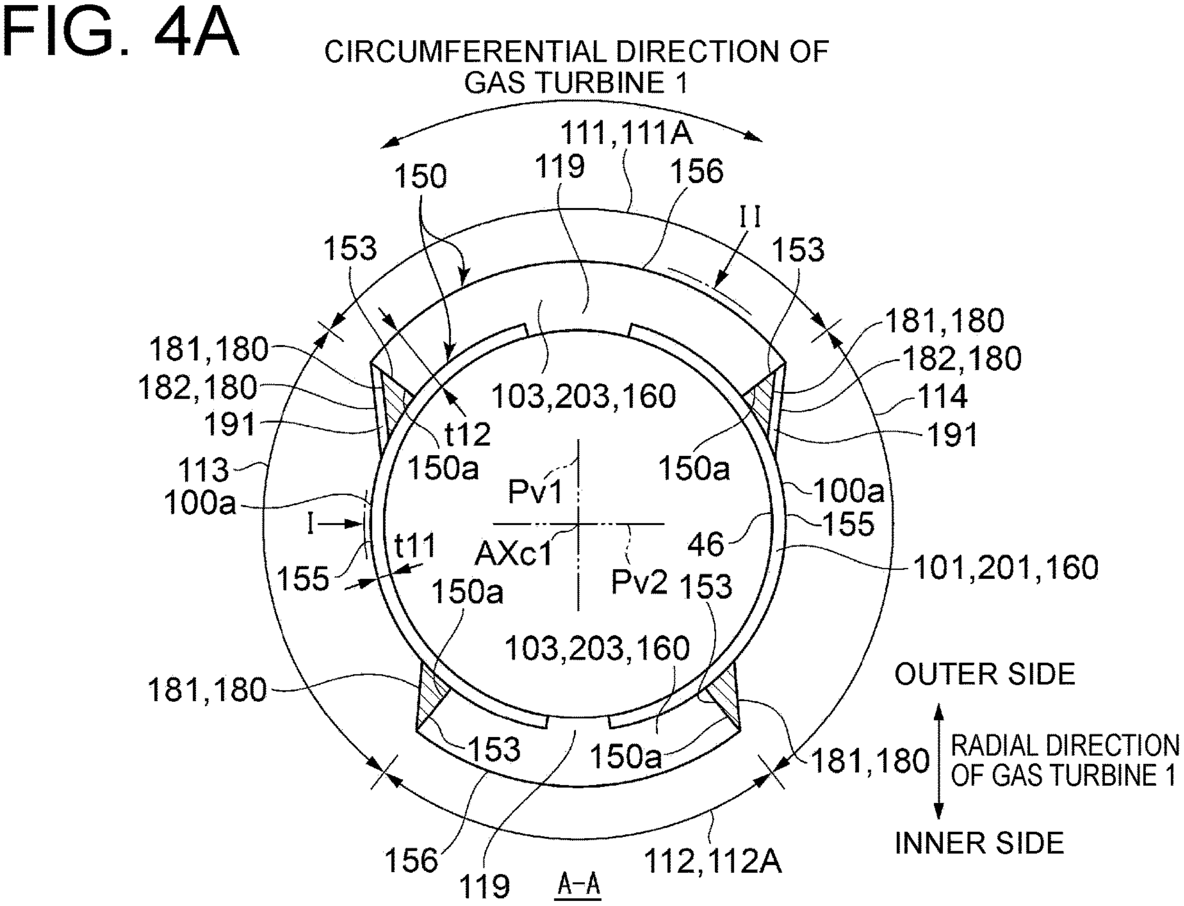
FIG. 4A is a cross-sectional arrow view taken along line A-A in FIG. 3.

FIG. 4A is a cross-sectional arrow view taken along line A-A in FIG. 3.

Figure 4B:
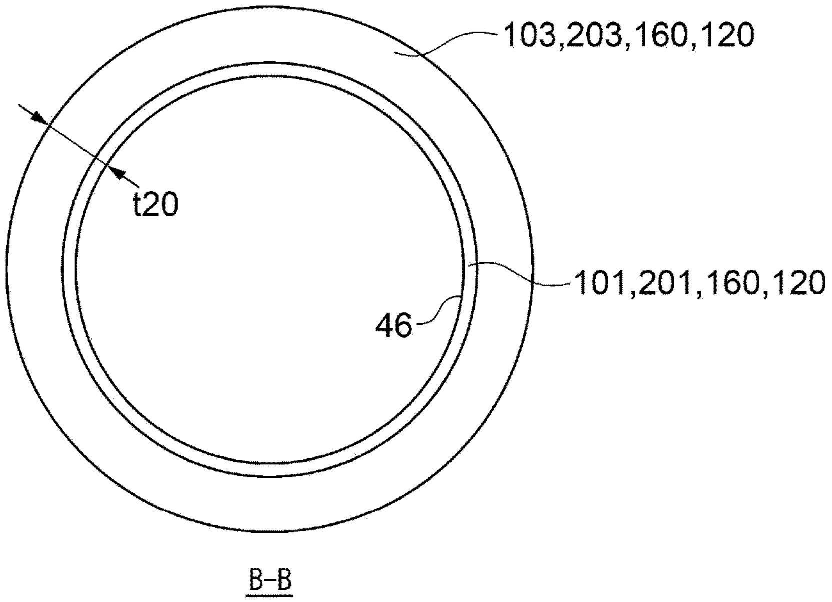
FIG. 4B is a cross-sectional arrow view taken along line B-B in FIG. 3.

FIG. 4B is a cross-sectional arrow view taken along line B-B in FIG. 3.

Figure 4C:
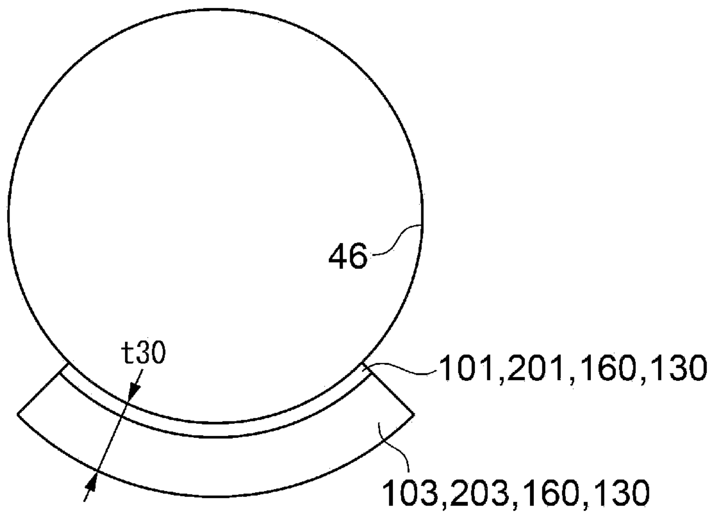
FIG. 4C is a cross-sectional arrow view taken along line C-C in FIG. 3

FIG. 4C is a cross-sectional arrow view taken along line C-C in FIG. 3.

FIGS. 4A, 4B, and C show the cross sections of the plate of the combustion cylinder 46 and the housing 150 described below taken along the thickness direction, and the cross sections are depicted in solid lines. Thus, regions closed by the solid lines correspond to the internal space of the combustion cylinder 46 and the resonance chamber (resonance space) 160 of the acoustic device 100 described below. In FIG. 4A, for a member whose plate surface is in front of the drawing (e.g., the first plate member 181 described below), the surface is drawn with hatching.

Figure 5A:
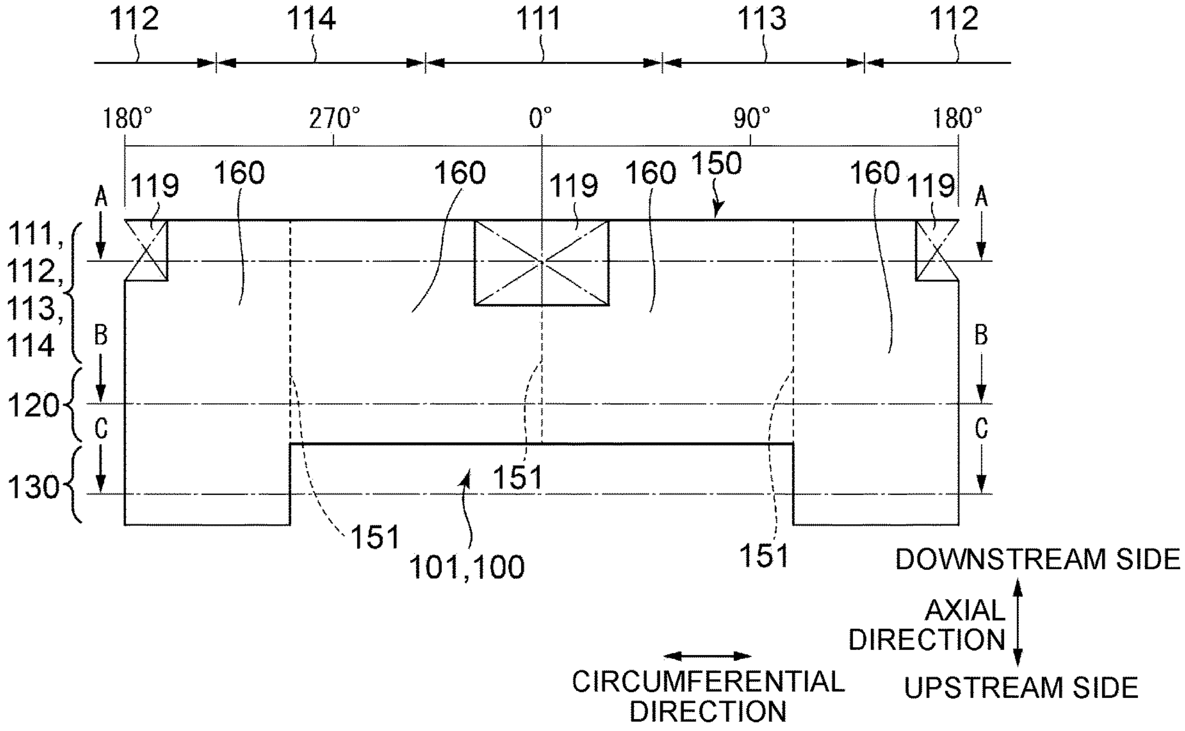
FIG. 5A is a development view of an acoustic device according to some embodiments developed along the circumferential direction of the combustion cylinder.

FIG. 5A is a development view of an acoustic device 100 according to some embodiments developed along the circumferential direction of the combustion cylinder 46, showing a development view of an inner acoustic device 101 corresponding to the I arrow view in FIG. 4A.

Figure 5B:
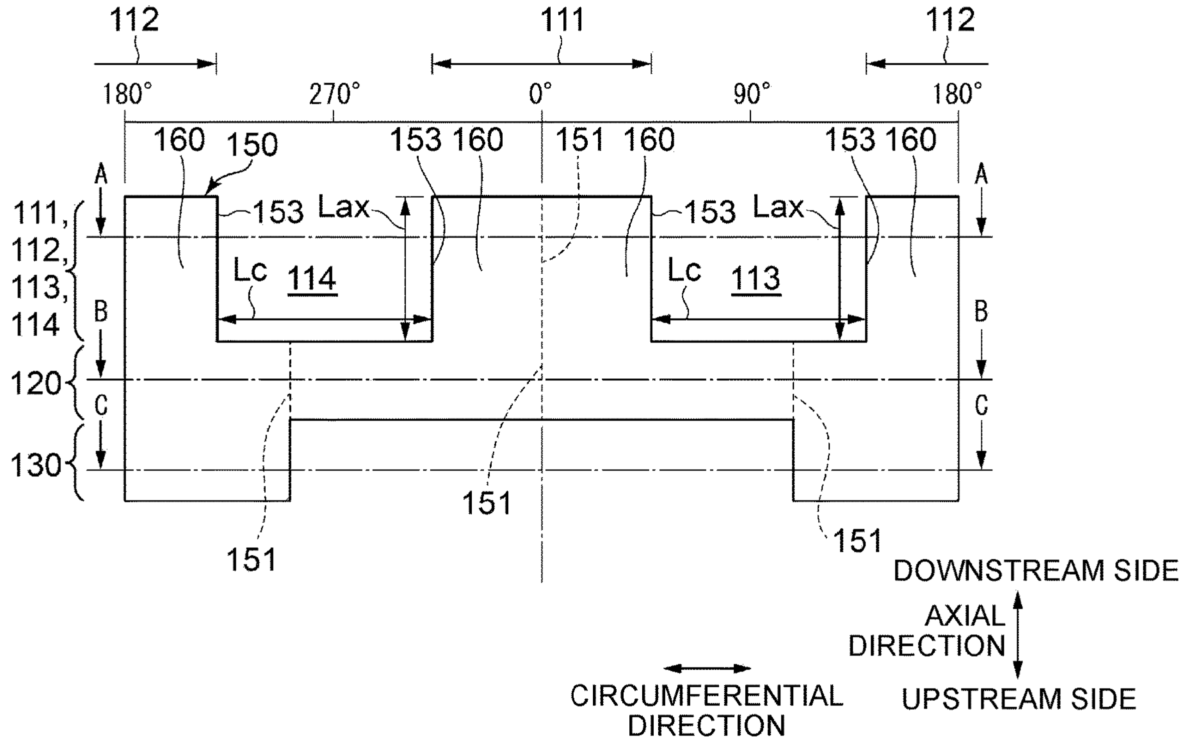
FIG. 5B is a development view of an acoustic device according to some embodiments developed along the circumferential direction of the combustion cylinder.

FIG. 5B is a development view of an acoustic device 100 according to some embodiments developed along the circumferential direction of the combustion cylinder 46, showing a development view of an outer acoustic device 103 corresponding to the II arrow view in FIG. 4A.

In FIGS. 5A and 5B, with regard to the position of the combustion cylinder 46 in the axial direction, the positions of the A-A arrow cross section, the B-B arrow cross section, and the C-C cross section in FIG. 3 are shown in single-dotted chain lines.

The acoustic device 100 according to some embodiments has a housing 150 forming a plurality of resonance chambers (resonance spaces) 160 for attenuating combustion oscillation, which are disposed independently from one another. The housing 150 forms an inner acoustic device 101 disposed at the inner side in the radial direction of the combustion cylinder and an outer acoustic device 103 other than the inner acoustic device 101 disposed at least partially at the outer side of the inner acoustic device 101 in the radial direction of the combustion cylinder 46. That is, the acoustic device 100 according to some embodiments includes the inner acoustic device 101 and the outer acoustic device 103.

Each of the plate members constituting the housing 150 is fixed to the outer surface of the combustion cylinder 46 directly or indirectly.

For instance, when different functions are assigned to the inner acoustic device 101 and the outer acoustic device 103, such as attenuating combustion oscillation of different frequencies, a function that can be effective with a relatively small capacity may be assigned to the inner acoustic device 101 positioned at the inner side in the radial direction of the combustion cylinder 46, which is likely to have a smaller capacity. Furthermore, for instance, a function that requires a relatively large capacity may be assigned to the outer acoustic device 103 positioned at the outer side in the radial direction of the combustion cylinder 46, which is capable of having a larger capacity readily.

That is, with the acoustic device 100 according to some embodiments, it is easier to set functions to be assigned to the inner acoustic device 101 and the outer acoustic device 103 reasonably from the perspective of capacity.

In the acoustic device 100 according to some embodiments, the inner acoustic device 101 constitutes an acoustic liner 201, and the outer acoustic device 103 constitutes an acoustic damper 203.

The acoustic liner 201 is an acoustic device capable of reducing oscillation of a relatively high frequency caused by combustion oscillation, and the acoustic damper 203 is an acoustic device capable of reducing oscillation of a relatively low frequency caused by combustion oscillation. Thus, the acoustic damper 203 requires a relatively large resonance space compared to the acoustic liner 201.

Thus, the acoustic liner 201 capable of exerting an effect even with a relatively small capacity may be preferably assigned to the inner acoustic device 101 positioned at the inner side in the radial direction of the combustion cylinder 46, which tends to have a smaller capacity. Furthermore, for instance, the acoustic damper 203 that requires a relatively large capacity may be preferably assigned to the outer acoustic device 103 positioned at the outer side in the radial direction of the combustion cylinder 46, which is easier to have a larger capacity.

Accordingly, with the acoustic device 100 according to some embodiments, it is possible to set functions to be assigned to the inner acoustic device 101 and the outer acoustic device 103 reasonably from the perspective of capacity.

As depicted in FIGS. 5A and 5B for instance, the inner acoustic device 101 and the outer acoustic device 103 according to some embodiments each have a plurality of resonance chambers (resonance spaces) 160 which are independent from one another. As depicted in FIGS. 5A and 5B, adjacent resonance chambers 160 are separated by a partition member 151 shown in broken lines.

Each resonance chamber 160 may have non-depicted partition plates disposed inside the resonance chamber 160 such that the resonance space extends bending or tortuously inside the resonance chamber 160.

In FIGS. 5A and 5B, the top-bottom direction in the drawings is the axial direction along the center axis AXc of the combustion cylinder 46, and the right-left direction in the drawings is the circumferential direction of the combustion cylinder 46 centered at the center axis AXc of the combustion cylinder 46. In the following description, the axial direction along the center axis AXc of the combustion cylinder 46 is referred to as the axial direction of the combustion cylinder 46 or merely the axial direction, and the circumferential direction centered at the center axis AXc of the combustion cylinder 46 is referred to as the circumferential direction of the combustion cylinder 46, or merely the circumferential direction. Similarly, in the following description, the radial direction centered at the center axis AXc of the combustion cylinder 46 will be referred to as the radial direction of the combustion cylinder 46, or as merely the radial direction.

With regard to the axial direction of the combustion cylinder 46, the side where the injection port 46*d* of the combustion gas exists is referred to as the downstream side, and the other side where the pilot combustion burner 50 and the like exist is referred to as the upstream side.

Furthermore, in the following description, the axial direction along the center axis AX of the gas turbine 1 is referred to as the axial direction of the gas turbine 1, the circumferential direction centered at the center axis AX of the gas turbine 1 is referred to as the circumferential direction of the gas turbine 1, and the radial direction centered at the center axis AX of the gas turbine 1 is referred to as the radial direction of the gas turbine 1.

With regard to the axial direction of the gas turbine 1, the side where the turbine 6 and the exhaust chamber 30 are disposed is referred to as the downstream side and the other side where the compressor 2 is disposed is referred to as the upstream side, with respect to the position of the combustor 4.

With regard to the position of the acoustic device 100 in the circumferential direction, in the radial direction of the gas turbine centered at the center axis AX of the gas turbine 1, the circumferential-directional position farthest away from the center axis AX of the gas turbine 1 is defined as zero degrees. The value of the angular degree of the circumferential-directional position increases in the counterclockwise direction from the position where the circumferential-directional position is zero degrees when the combustion cylinder 46 is seen from the downstream side in the axial direction.

The plurality of resonance chambers 160 of the inner acoustic device 101 are in communication with the internal space of the combustion cylinder 46 via a plurality of non-depicted acoustic holes formed on the combustion cylinder 46.

The plurality of resonance chambers 160 of the outer acoustic device 103 are in communication with the internal space of the combustion cylinder 46 via a plurality of non-depicted acoustic holes formed on the combustion cylinder 46 in a region 119 where the inner acoustic device 101 is not disposed, as depicted in FIG. 5A.

In the example depicted in FIGS. 5A and 5B, the plurality of acoustic holes that bring the plurality of resonance chambers 160 of the outer acoustic device 103 and the internal space of the combustion cylinder 46 into communication are formed in a region of the acoustic device 100 at the downstream side in the axial direction of the combustion cylinder 46. Nevertheless, the acoustic holes may be formed in a region other than the above region. Similarly, while the plurality of acoustic holes are formed in a region in the vicinity of zero degrees and in the vicinity of 180 degrees in the circumferential direction of the combustion cylinder 46, the plurality of acoustic holes may be formed in a region other than the above region.

(Distance Between the Combustors 4 Disposed Adjacent in the Circumferential Direction of the Gas Turbine 1)

Figure 6:
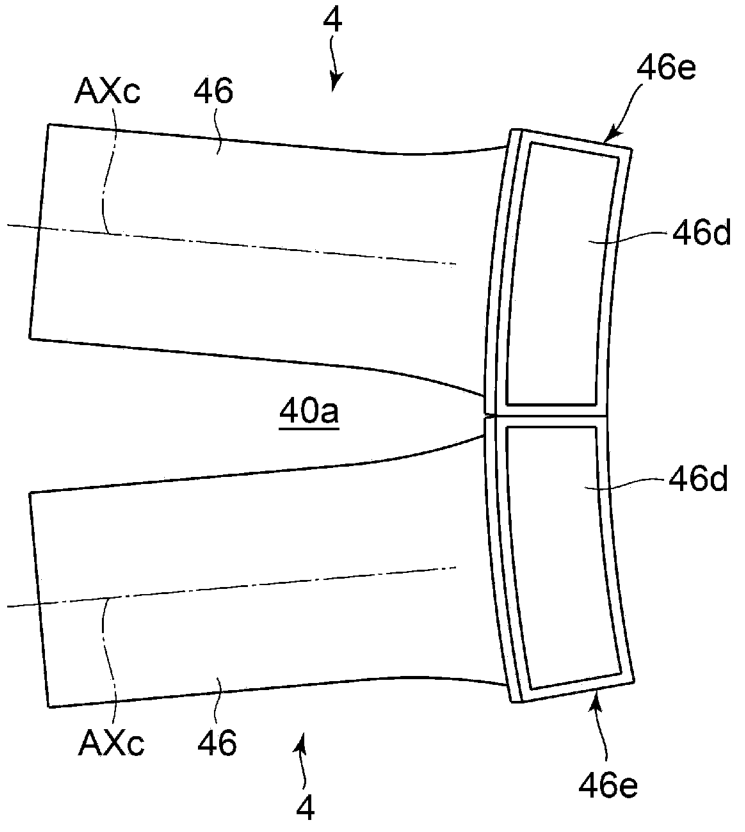
FIG. 6 is a schematic diagram for describing the distance between the adjacent combustors in the circumferential direction of the gas turbine.
Figure 7:
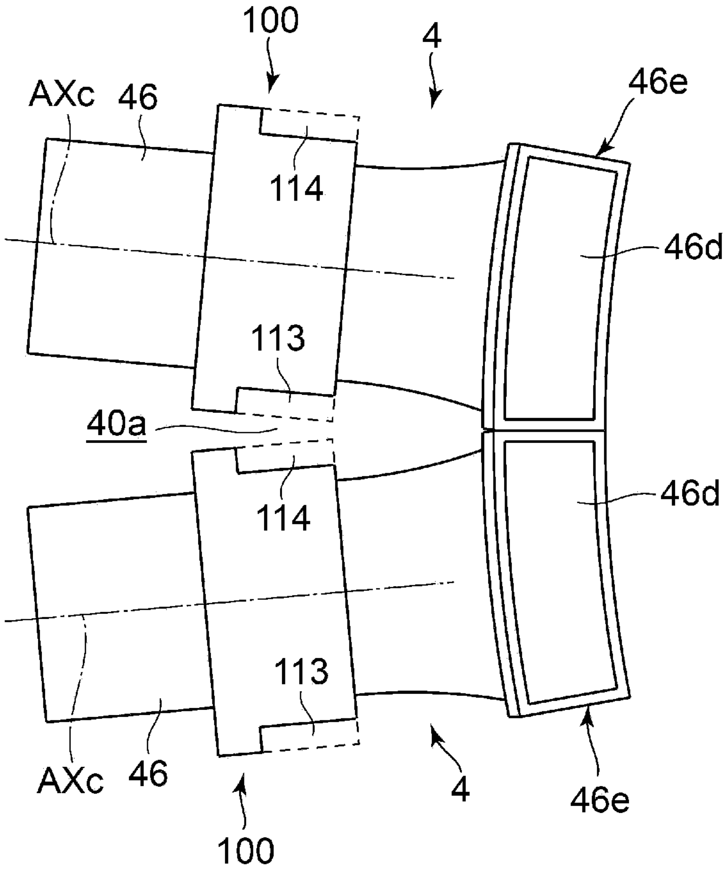
FIG. 7 is a schematic diagram for describing the distance between the adjacent combustors in the circumferential direction of the gas turbine.

FIGS. 6 and 7 are schematic diagrams for describing the distance between the combustors 4 disposed adjacent in the circumferential direction of the gas turbine 1, where the combustion cylinders 46 of two combustors 4 disposed adjacent in the circumferential direction of the gas turbine 1 are seen from the outer side in the radial direction of the gas turbine 1 like the VII arrow view of FIG. 3. In FIG. 6, illustration of the acoustic device 100 is omitted for the sake of description.

Generally, in an industrial gas turbine, a plurality of combustors 4 are arranged along the circumferential direction of the gas turbine 1 like the gas turbine 1 according to some embodiments. Furthermore, due to the positional relationship of the turbine rotor blades 26 of the turbine 6 and the combustors 4 in the radial direction of the gas turbine 1, the plurality of combustors 4 need to be disposed close to the radially inner side of the gas turbine 1. Thus, the distance between adjacent combustors 4 in the circumferential direction of the gas turbine 1 tends to be relatively small.

As depicted in FIG. 2, compressed air for combustion introduced into the combustor casing 40 from the compressor 2 flows into the combustor casing 40 toward the downstream side in the axial direction of the gas turbine 1 as indicated by arrow 'a', at a position closer to the inner side in the radial direction of the gas turbine 1 compared to the plurality of combustors 4 arranged adjacent in the circumferential direction of the gas turbine 1. Then, the flow of compressed air for combustion introduced into the combustor casing 40 flows toward the outer side in the radial direction of the gas turbine as indicated by arrows 'b' and 'c', while turning toward the upstream side in the axial direction of the gas turbine 1 as indicated by arrows 'd' and 'e', thereby flowing into the combustion cylinder 46 from the upstream side in the axial direction of the combustion cylinder 46.

After the compressed air flows into the combustor casing 40 as described above, in the course of flowing into the combustion cylinder 46, as indicated by arrow 'c', a part of compressed air passes through the space (gap) 40*a* between the combustion cylinders 46 of adjacent combustors 4 in the circumferential direction of the gas turbine 1 (see FIG. 6). Thus, if the space 40*a* between the combustion cylinders 46 adjacent in the circumferential direction of the gas turbine 1 is too small, the flow of compressed air flowing into the combustion cylinder 46 may become more unevenly distributed with respect to the position in the circumferential direction of the combustion cylinder 46. Thus, the flame temperature may increase locally inside the combustion cylinder 46, for instance, which may lead to an increase in combustion oscillation or an increase in Nox, for instance.

Furthermore, an industrial gas turbine is often provided with an acoustic device 100 for attenuating combustion oscillation like the gas turbine 1 according to some embodiments. The acoustic device 100 is often mounted on the outer circumference of the combustion cylinder 46, and thus the space 40*a* between the adjacent combustion cylinders 46 in the circumferential direction of the gas turbine 1 tends to become even smaller (see FIG. 7.) In FIG. 7, the solid lines showing the acoustic device 100 schematically indicate the shape of the acoustic device 100 in a case where the pair of second regions 113, 114 described below are provided. Furthermore, in FIG. 7, the broken lines showing the acoustic device 100 schematically indicate the shape of a typical acoustic device which does not have the pair of second regions 113, 114 described below.

In the combustor 4 according to some embodiments, the acoustic device 100 includes a pair of first regions 111, 112 and the third region 120 described below.

Herein, the acoustic device 100 according to some embodiments has a pair of first regions 111, 112 positioned at the downstream side of the combustion cylinder 46, and disposed at a pair of positions 111A, 112A across the combustion cylinder 46 in the radial direction of the combustion cylinder 46 (see FIG. 4A and FIGS. 8 and 9 described below). The acoustic device 100 has a pair of second regions 113, 114 whose axial-direction position with respect to the combustion cylinder 46 overlaps at least partially with the pair of first regions 111, 112 (the pair of positions 111A, 112A), and whose circumferential-direction position with respect to the combustion cylinder 46 is different from that of the pair of first regions 111, 112 (the pair of positions 111A, 112A), the pair of second regions 113, 114 being disposed at positions across the combustion cylinder 46 in the radial direction. The acoustic device 100 has the third region 120 positioned at the upstream side of first regions 111, 112 and the second regions 113, 114 with respect to the combustion cylinder 46. The thickness t11 of the acoustic device 100 in the radial direction in the pair of second regions 113, 114 is smaller than the thickness t12 of the acoustic device 100 in the radial direction in the first regions 111, 112. The thickness t20 of the acoustic device 100 in the radial direction in the third region 120 is larger than the thickness t11 of the acoustic device 100 in the radial direction in the pair of second regions 113, 114.

In a case where the combustor 4 according to some embodiments has the above configuration, when arranging a plurality of the combustors 4 in the circumferential direction of the gas turbine 1, it is preferable to arrange the plurality of combustors 4 such that the pair of second regions 113, 114 are positioned along the circumferential direction of the gas turbine 1 (see FIG. 7). Accordingly, the thickness t11 of the acoustic device 100 in the pair of second regions 113, 114 is smaller than the thickness t12 of the acoustic device 100 in the pair of first regions 111, 112, and thus it is easier to ensure the space 40*a* between the combustion cylinders 46 disposed adjacent in the circumferential direction of the gas turbine 1. Thus, for the flow of compressed air flowing into the combustion cylinder 46, it is possible to suppress the above described uneven distribution with respect to the position in the circumferential direction of the combustion cylinder 46. Thus, it is possible to realize the combustor 4 capable of suppressing occurrence of combustion oscillation and NOx, for instance.

In each embodiment, the thickness of the acoustic device 100 in the radial direction refers to the distance of the combustion cylinder 46 in the radial direction of the combustion cylinder 46 from the outer circumferential surface of the combustion cylinder 46 provided with the acoustic device 100 to the end surface of the acoustic device 100 at the outer side in the radial direction of the combustion cylinder 46. Furthermore, in the following description, the thickness of the acoustic device 100 in the radial direction will also be referred to as the thickness of the acoustic device 100.

In the combustor 4 according to some embodiments, the acoustic device 100 may have the following configuration.

In the combustor 4 according to some embodiments, the combustion cylinder 46 has an injection part 46*e* forming an injection port 46*d* for combustion gas formed at an end portion at the downstream side. The center axis AXc of the combustion cylinder 46 has the first center axis AXc1 at the upstream side of the combustion cylinder 46 and the second center axis AXc2 at the injection part 46*e*, which extend in different directions. The pair of first regions 111, 112 may preferably intersect with the first virtual plane Pv1 including the first center axis AXc1 and the second center axis AXc2. The pair of second regions 113, 114 may preferably intersect with the second virtual plane Pv2 including the first center axis AXc1 and intersecting orthogonally with the first virtual plane Pv1.

In some embodiments, in a case where the plurality of gas turbine combustors 4 are arranged in the circumferential direction of the gas turbine 1, by arranging the plurality of gas turbine combustors 4 such that the pair of second regions 113, 114 are positioned along the circumferential direction of the gas turbine 1, it is easier to ensure the space 40*a* between the combustion cylinders 46 adjacent in the circumferential direction of the gas turbine 1 as described above. Furthermore, in a case where the gas turbine combustors 4 are arranged as described above, the region 111 and the other region 112 of the pair of first regions 111, 112 having a larger thickness t12 in the radial direction than the thickness t11 in the radial direction in the pair of second regions 113, 114 are arranged in the radial direction of the gas turbine 1. Thus, the pair of first regions 111, 112 are less likely to interfere with one another between the gas turbine combustors 4 adjacent in the circumferential direction of the gas turbine 1, and thus it is easier to ensure the capacity of the pair of first regions 111, 112.

Figure 8:
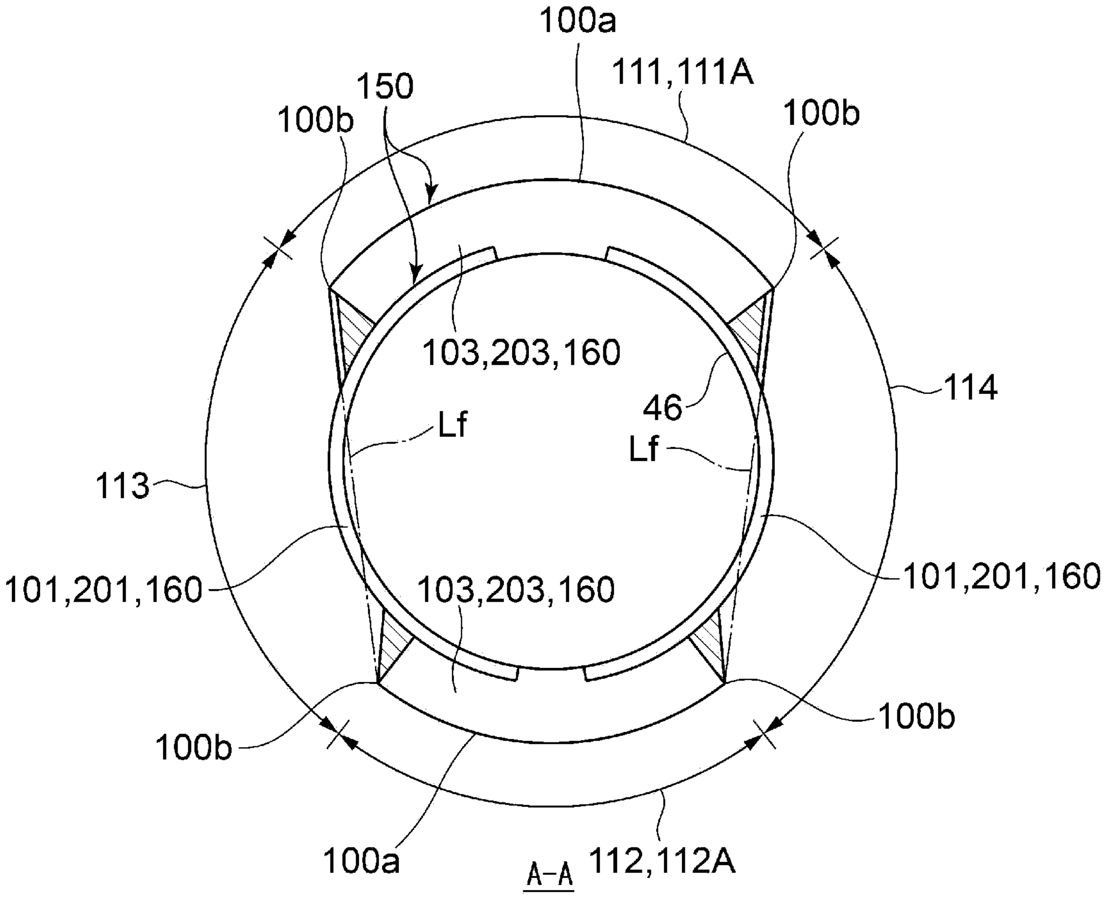
FIG. 8 is a cross-sectional arrow view taken along line A-A in FIG. 3.

FIG. 8 is a cross-sectional arrow view taken along line A-A in FIG. 3, for describing the positional and dimensional relationship between the pair of first regions 111, 112 and the pair of second regions 113, 114.

In the combustor 4 according to some embodiments, as depicted in FIG. 8, at least a part of at least one of the pair of second regions 113, 114 may be preferably disposed at the outer side in the radial direction, of a line segment Lf connecting two end portions positioned across the at least one of the pair of second regions 113, 114, of the end portions 100*b*, in the circumferential direction of the combustion cylinder 46, of the outer surface 100*a* in the pair of first regions 111, 112, when seen along the first center axis AXc1 at the upstream side of the combustion cylinder 46, of the center axis AXc of the combustion cylinder 46.

In some embodiments, in a case where the plurality of gas turbine combustors 4 are arranged in the circumferential direction of the gas turbine 1, by arranging the plurality of gas turbine combustors 4 such that the pair of second regions 113, 114 are positioned along the circumferential direction of the gas turbine 1, the direction of arrangement of the region 111 and the other region 112 of the pair of first regions 111, 112 become closer to the radial direction of the gas turbine 1. In the combustor 4 according to some embodiments, the end portion 100*b* does not protrude further in the circumferential direction than the most protruding portion of one of the pair of second regions 113, 114 protruding in the circumferential direction of the gas turbine 1. Thus, it is possible to suppress the size of the pair of first regions 111, 112 along the circumferential direction, and thus the pair of first regions 111, 112 are less likely to interfere with one another between the gas turbine combustors 4 adjacent in the circumferential direction of the gas turbine 1.

Figure 9:
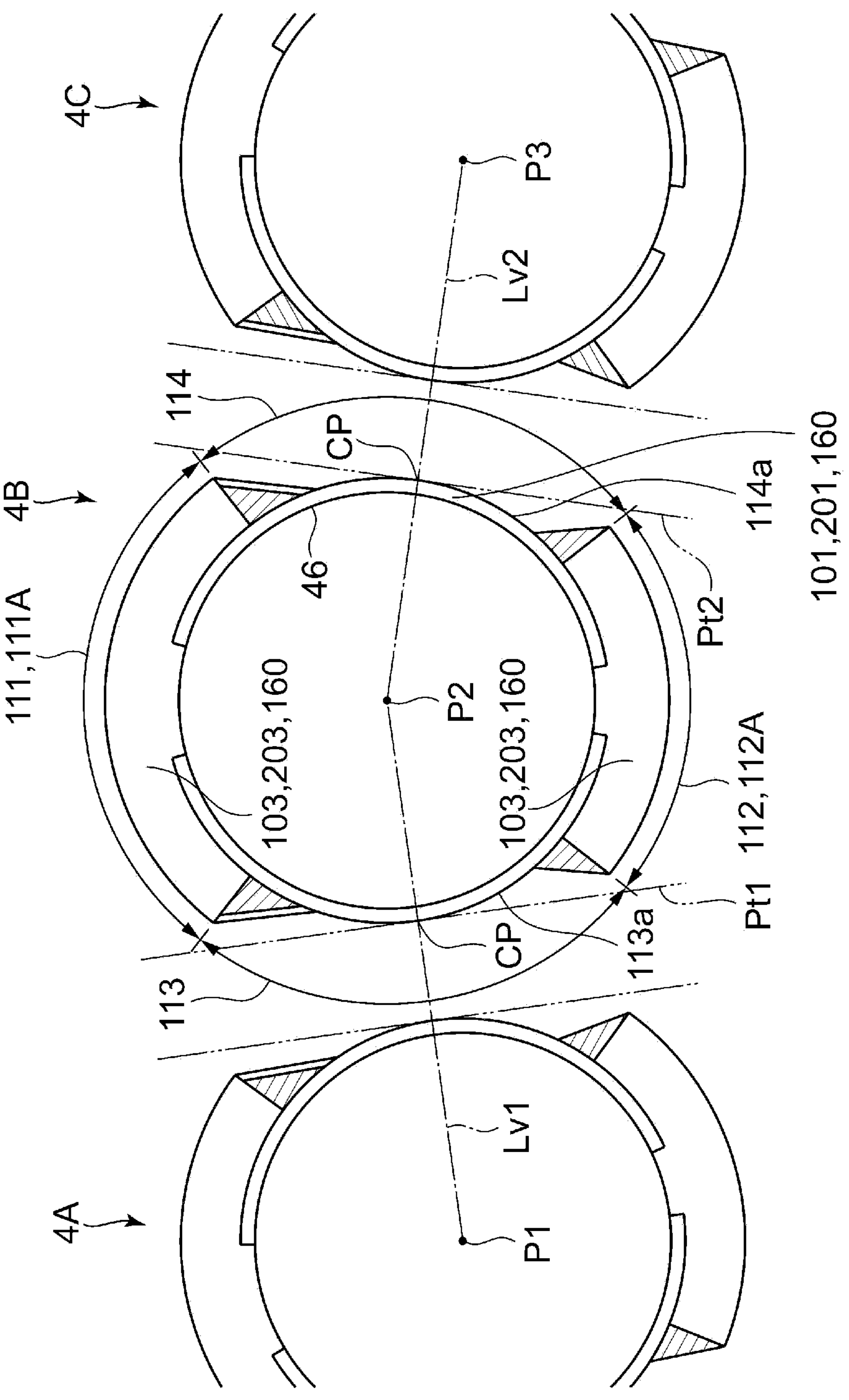
FIG. 9 is a cross-sectional view of a combustor as seen from the downstream side along the first center axis at the upstream side of the combustion cylinder.

FIG. 9 is a cross-sectional view of a combustor 4 as seen from the downstream side along the first center axis AXc1 at the upstream side of the combustion cylinder 46, showing the combustor 4 with other four combustors 4 which are adjacent in the circumferential direction of the gas turbine 1.

In some embodiments, as depicted in FIG. 9, the plurality of gas turbine combustors 4 include first to third gas turbine combustors 4A, 4B, 4C arranged sequentially in the circumferential direction of the gas turbine 1. In the second gas turbine combustor 4B, the second point P2 is defined as a point which exists within a range in the axial direction of the second gas turbine combustor 4B where the pair of second regions 113, 114 exist, and on the first center axis AXc1 at the upstream side of the combustion cylinder 46 of the second gas turbine combustor 4B. In the first gas turbine combustor 4A, the first point P1 is defined as a point which exists within a range in the axial direction of the first gas turbine combustor 4A where the pair of second regions 113, 114 exist, and on the first center axis AXc1 at the upstream side of the combustion cylinder 46 of the first gas turbine combustor 4A, the point having the same axial-direction position as the second point P2 of the second gas turbine combustor 4B. In the third gas turbine combustor 4C, the third point P3 is defined as a point which exists within a range in the axial direction of the third gas turbine combustor 4C where the pair of second regions 113, 114 exist, and on the center axis AXc1 at the upstream side of the combustion cylinder 46 of the third gas turbine combustor 4C, the point having the same axial-direction position as the second point P2 of the second gas turbine combustor 4B. The first tangent plane Pt1 is defined as a tangent plane to the outer surface 113*a*, 114*a* of the second gas turbine combustor 4B in the pair of second regions 113, 114 contacting with the outer surface 113*a*, 114*a* at an intersection position CP where the first line segment Lv1 connecting the second point P2 and the first point P1 and the outer surface 113*a*, 114*a* intersect between the second point P2 and the first point P1. The second tangent plane Pt2 is defined as a tangent plane to the outer surface 113*a*, 114*a* of the second gas turbine combustor 4B in the pair of second regions 113, 114 contacting with the outer surface 113*a*, 114*a* at an intersection position CP where the second line segment Lv2 connecting the second point P2 and the third point P3 and the outer surface 113*a*, 114*a* intersect between the second point P2 and the third point P3.

The pair of first regions 111, 112 of the second gas turbine combustor 4B may preferably exist between the first tangent plane Pt1 and the second tangent plane Pt2.

Accordingly, it is possible to suppress the size of the pair of first regions 111, 112 along the circumferential direction of the gas turbine 1, and thus the pair of first regions 111, 112 are less likely to interfere with one another between the gas turbine combustors 4 adjacent in the circumferential direction of the gas turbine 1.

For instance, in the acoustic device 100 according to some embodiments, the size Lc of one of the pair of second regions 113, 114 along the circumferential direction of the combustion cylinder 46 is greater than the size Lax along the axial direction of the combustion cylinder 46.

Accordingly, it is possible to increase the distance between adjacent combustors 4 compared to a case where the size Lc along the circumferential direction of the combustion cylinder 46 is smaller than the size Lax 46 along the axial direction of the combustion cylinder, while ensuring the capacity of the acoustic device 100 in the pair of second regions 113, 114.

The size Lc along the circumferential direction may be different between the region 113 and the other region 114. Similarly, the size Lex along the axial direction may be different between the region 113 and the other region 114.

In the acoustic device 100 according to some embodiments, a part of the third region 120 may overlap in the circumferential direction with at least a part of the pair of second regions 113, 114.

Generally, when the combustor 4 is mounted on the casing 20 of the gas turbine 1, the combustor 4 is mounted inclined with respect to the center axis AX such that the downstream side of the combustion cylinder 46 is closer to the axis of the rotor 8 of the gas turbine 1, that is, the center axis AX of the gas turbine 1, than the upstream side. Thus, when the plurality of combustors 4 are arranged along the circumferential direction of the gas turbine 1, the pitch circle about the center axis AXc of each combustor 4 becomes smaller toward the downstream side of the combustion cylinder 46. Thus, the distance between adjacent combustion cylinders 46 in the circumferential direction of the gas turbine 1 tends to become smaller toward the downstream side of the combustion cylinder 46. On the other hand, the distance between adjacent combustion cylinders 46 in the circumferential direction of the gas turbine 1 tends to be greater toward the upstream side of the combustion cylinder 46.

Thus, even if the third region 120 positioned at the upstream side of the combustion cylinder 46 compared to the pair of first regions 111, 112 and the pair of second regions 113, 114 overlaps in the circumferential direction with at least a part of the pair of second regions 113, 114 as described above, the flow of compressed air passing through the space 40*a* between the adjacent combustion cylinders 46 is not much affected. Furthermore, if the third region 120 positioned at the upstream side of the combustion cylinder 46 compared to the pair of first regions 111, 112 and the pair of second regions 113, 114 is allowed to overlap in the circumferential direction with at least a part of the pair of second regions 113, 114 as described above, it is easier to ensure the capacity of the acoustic device 100 in the third region 120.

In the acoustic device 100 according to some embodiments, the thickness t12 of the acoustic device 100 in the radial direction in the pair of first regions 111, 112 is preferably not smaller than twice the thickness t11 of the acoustic device 100 in the radial direction in the second regions 113, 114.

By setting a larger difference between the thickness t12 of the acoustic device 100 in the radial direction in the pair of first regions 111, 112 and the thickness t11 of the acoustic device 100 in the radial direction in the second regions 113, 114, it is possible to increase the distance between the adjacent combustors 4 while ensuring the capacity of the acoustic device 100.

In some embodiments, the acoustic device 100 may further include a fourth region 130 positioned at the upstream side of the third region 120 with respect to the combustion cylinder 46, the fourth region 130 having a different existence range from the third region 120 in the circumferential direction of the combustion cylinder 46. The thickness t30 of the acoustic device 100 in the radial direction in the fourth region 130 is preferably larger than the thickness t11 of the acoustic device 100 in the radial direction in the pair of second regions 113, 114.

As described above, the distance between the combustion cylinders 46 disposed adjacent in the circumferential direction of the gas turbine 1 tends to become greater toward the upstream side of the combustion cylinder 46. Thus, providing the fourth region 130 at the upstream side of the third region 120 has less influence on the flow of compressed air passing through the space 40*a* between the adjacent combustion cylinders 46.

By providing the fourth region 130, it is possible to suppress influence on the flow of compressed air passing through the space 40*a* between the adjacent combustion cylinders 46, while ensuring the capacity of the acoustic device 100.

In some embodiments, as described above, the acoustic device 100 may preferably include a plurality of resonance chambers 160 which are independent from one another. At least one resonance chamber 160 may be disposed, as depicted in FIG. 5 for instance, over one of the pair of first regions 111, 122 (that is, at least one of the region 111 or the other region 112), and the third region 120.

Accordingly, it is easier to ensure the capacity of the resonance chamber 160.

Furthermore, depicted in FIG. 5B for instance, at least one resonance chamber 160 may be disposed over the third region 120 and the fourth region 130, or over at least one of the region 111 or the other region 112, the third region 120, and the fourth region 130.

In the acoustic device 100 according to some embodiments, preferably, the inner acoustic device 101 exists and the outer acoustic device 103 does not exist in the pair of second regions 113, 114, and the inner acoustic device 101 and the outer acoustic device 103 exist in the pair of first regions 111, 112.

Accordingly, it is possible to easily set the thickness t11 of the acoustic device 100 in the pair of second regions 113, 114 to be smaller than the thickness t12 of the acoustic device 100 in the first regions 111, 112.

In the acoustic device 100 according to some embodiments, each of the inner acoustic device 101 and the outer acoustic device 103 may preferably include at least one resonance chamber 160.

Accordingly, it is possible to assign different functions to the resonance chambers 160 of the inner acoustic device 101 and the outer acoustic device 103, such as attenuating combustion oscillation of different frequencies.

In the acoustic device 100 according to some embodiments, the at least one resonance chamber 160 of the outer acoustic device 103 may be disposed, as depicted in FIG. 5B for instance, over at least one of the pair of first regions 111, 112 (that is, at least one of the region 111 or the other region 112) and the third region 120.

Accordingly, it is easier to ensure the capacity of the resonance chamber 160.

Furthermore, as depicted in FIG. 5B for instance, at least one resonance chamber 160 of the outer acoustic device 103 may be disposed over the third region 120 and the fourth region 130, or over at least one of the region 111 or the other region 112, the third region 120, and the fourth region 130.

(Connection Member 180)

In some embodiments, the acoustic device 100 may further include a connection member 180 connecting an end surface 150*a*, in the circumferential direction of the combustion cylinder 46, of the acoustic device 100 in the pair of first regions 111, 112 and an outer circumferential surface (outer surface 100*a*) of the acoustic device 100 in the pair of second regions 113, 114.

The detail of the connection member 180 will be described below specifically.

In the combustor 4 according to some embodiments, the thickness t12 of the acoustic device 100 in the pair of first regions 111, 112 is different from the thickness t11 of the acoustic device 100 in the pair of second regions 113, 114. Thus, the rigidity of the acoustic device 100 is different between the pair of first regions 111, 1212 and the pair of second regions 113, 114. Specifically, the rigidity of the acoustic device 100 in the pair of second regions 113, 114 is smaller than the rigidity of the acoustic device 100 in the first regions 111, 112. Thus, when the air-fuel mixture of the fuel and the compressed air for combustion combusts in the combustor 4 and the temperature of the combustion cylinder 46 increases, the combustion cylinder 46 tends to deform such that the region 113 and the other region 114 of the pair of second regions 113, 114 move farther away from one another and the region 111 and the other region 112 of the pair of first regions 111, 112 approach one another. Such deformation of the combustion cylinder 46 is also referred to as lateral oval deformation.

In the acoustic device 100 according to some embodiments, by connecting the end surface 150*a* of the acoustic device 100 and the outer circumferential surface 100*a* of the acoustic device 100 in the pair of second regions 113, 114 via the connection member 180, the acoustic device 100 in the pair of second regions 113, 114 is less likely to deform, and thus it is possible to suppress the above described lateral oval deformation of the combustion cylinder 46.

For instance, the connection member 180 may include at least one plate member 181 disposed such that the plate thickness direction is along the axial direction of the combustion cylinder 46.

In FIG. 4A, the surface of the plate of the first plate member 181 is oriented toward the front side and the rear side of the drawing. Thus, in FIG. 4A, as described above, the surface of the plate of the first plate member 181 is drawn in hatching.

In the combustor 4 according to some embodiments, the end surface 150*a* of the acoustic device 100 in the pair of first regions 111, 112 intersects with the outer circumferential surface 100*a* of the acoustic device 100 in the pair of second regions 113, 114. Thus, the surface of the combustor 4 has a recess portion 191 formed by the end surface 150*a* and the outer circumferential surface 100*a*.

As described above, the first plate member 181 is a plate member connecting the end surface 150*a* and the outer circumferential surface 100*a*, and is disposed such that the plate thickness direction is along the axial direction of the combustion cylinder 46. That is, the first plate member 181 is a rib-shaped member whose circumferential edge is connected to the end surface 150*a* and the outer circumferential surface 100*a*, extending in the circumferential direction and the radial direction of the combustion cylinder 46. Thus, the first plate member 181 functions to suppress the above described lateral oval deformation of the combustion cylinder 46, where the plate member 153 having the end surface 150*a* deforms as if collapsing relatively to the plate member 155 having the outer circumferential surface 100*a*. Thus, it is possible to suppress lateral oval deformation of the combustion cylinder 46 described above, with a member having a plate-shape that is a relatively simple shape.

Furthermore, for instance, the connection member 180 may include at least one second plate member 182 whose plate surface extends in the axial direction of the combustion cylinder 46. The second plate member 182 may preferably connect the end surface 150*a*, in the circumferential direction of the combustion cylinder 46, of the acoustic device 100 in at least one of the pair of first regions 111, 112 (that is, at least one of the region 111 or the other region 112) and the outer circumferential surface 100*a* of the acoustic device 100 in the pair of second regions 113, 114.

It should be noted that FIG. 4 shows the cross section of the second plate member 182 taken along the thickness direction of the plate.

Accordingly, it is possible to suppress lateral oval deformation of the combustion cylinder 46 described above, with a member having a plate-shape that is a relatively simple shape. Furthermore, by providing the second plate member 182, it is possible to suppress turbulence of the flow of compressed air flowing in a direction connecting the region 111 and the other region 112 of the pair of first regions 111, 112 along the outer circumferential surface 100*a* of the acoustic device 100 in the pair of second regions 113, 114 as described below. That is, the above described recess portion 191 is disposed on the surface of the combustor 4. Thus, if the second plate member 182 is not provided, the flow of compressed air flowing in a direction connecting the region 111 and the other region 112 of the pair of first regions 111, 112 along the outer circumferential surface 100*a* of the acoustic device 100 in the pair of second regions 113, 114 becomes turbulent when passing through the recess portion 191.

The second plate member 182 connects the end surface 150*a* of the acoustic device 100 in the pair of first regions 111, 112 and the outer circumferential surface 100*a* of the acoustic device 100 in the pair of second regions 113, 114, and has a plate surface extending along the axial direction of the combustion cylinder 46. Thus, the second plate member 182 is capable of covering the recess portion 191 so as to reduce the depth of the recess portion 191.

Thus, by providing the second plate member 182, it is possible to suppress turbulence of the flow of compressed air flowing in a direction connecting the region 111 and the other region 112 of the pair of first regions 111, 112 along the outer circumferential surface 100*a* of the acoustic device 100 in the pair of second regions 113, 114.

Herein, the flow of compressed air flowing in a direction connecting the region 111 and the other region 112 of the pair of first regions 111, 112 along the outer circumferential surface 100*a* of the acoustic device 100 in the pair of second regions 113, 114 is directed either toward the other region 112 from the region 111, or opposite. Therefore, from among the region 111 and the other region 112, it is sufficient if the second plate member 182 is disposed in a region positioned at the downstream side of the flow of the compressed air, and it is not always necessary to provide the second plate member 182 in a region disposed at the upstream side. In the example illustrated in FIG. 4A, the compressed air flows from the lower side of the drawing that is the radially inner side of the gas turbine 1 toward the upper side of the drawing that is the radially outer side of the gas turbine 1, and thus the second plate member 182 may be preferably disposed in the region 111. That is, in some embodiments, the flow of compressed air ai flowing in a direction connecting the region 111 and the other region 112 of the pair of first regions 111, 112 along the outer circumferential surface 100*a* of the acoustic device 100 in the pair of second regions 113, 114 corresponds to the flow of compressed air indicated by arrow 'c' in FIG. 2.

Furthermore, the above described first plate member 181 and the second plate member 182 may be provided such that the second plate member 182 covers the recess portion 191, and at least one first plate member 181 is disposed on the recess portion 191 covered by the second plate member 182.

That is, the connection member 180 may include at least one second plate member 182 as described below and at least one first plate member 181. Herein, the second plate member 182 is preferably a plate member having a plate whose surface extends in the axial direction of the combustion cylinder 46. The first plate member 181 is preferably a plate member disposed in a region surrounded by the second plate member 182, the end surface 150*a* in the circumferential direction of the acoustic device 100 in the pair of first regions 111, 112, and the outer circumferential surface 100*a* of the acoustic device 100 in the pair of second regions 113, 114, positioned such that the plate thickness direction of the first plate member 181 is along the axial direction of the combustion cylinder 46.

Accordingly, it is possible to achieve the advantageous effect of the first plate member 181 and the advantageous effect of the second plate member 182 described above. Furthermore, the first plate member 181 is disposed in a region surrounded by the second plate member 182, the end surface 150*a* of the acoustic device 100 in the pair of first regions 111, 112, and the outer circumferential surface 100*a* of the acoustic device 100 in the pair of second regions 113, 114. Accordingly, it is possible to suppress the influence of the first plate member 181 on the flow of compressed air flowing in a direction connecting the region 111 and the other region 112 of the pair of first regions 111, 112 along the outer circumferential surface 100*a* of the acoustic device 100 in the pair of second regions 113, 114.

For instance, in the acoustic device 100 according to some embodiments, the thickness of the plate member 153 having the end surface 150*a*, in the circumferential direction of the combustion cylinder 46, of the acoustic device 100 in the pair of first regions 111, 112 is preferably greater than the thickness of the plate member 156 having the outer circumferential surface 100*a* of the acoustic device 100 in the pair of first regions 111, 112.

By increasing the thickness of the plate member 153, it is possible to suppress the above described lateral oval deformation of the combustion cylinder 46.

In a case where the combustor 4 according to some embodiments described above is to be disposed on the gas turbine 1, two combustors 4 disposed adjacent in the circumferential direction of the gas turbine 1 may be disposed such that the region 113 of the pair of second regions 113, 114 of one of the two combustors 4 is adjacent to the other region 114 of the pair of second regions 113, 114 of the other one of the two combustors 4 in the circumferential direction of the gas turbine (see FIG. 7).

Accordingly, it is possible to increase the distance between the two combustors 4. Thus, for the flow of compressed air flowing into the combustion cylinder 46, it is possible to suppress the above described uneven distribution with respect to the position in the circumferential direction of the combustion cylinder 46. Thus, it is possible to realize the gas turbine 1 capable of suppressing occurrence of combustion oscillation and NOx, for instance.

(Gas Turbine Assembling Method)

Figure 10:
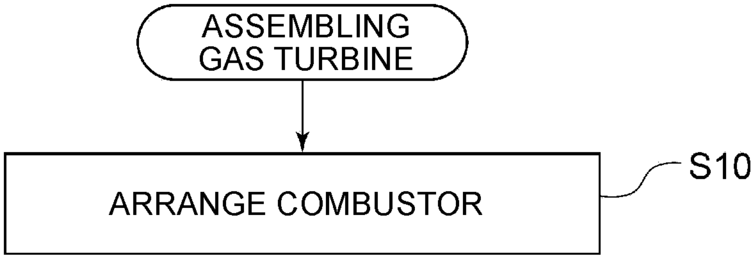
FIG. 10 is a flowchart describing the method of assembling a gas turbine according to an embodiment.

FIG. 10 is a flowchart describing the method of assembling a gas turbine according to an embodiment. The flow chart shown in FIG. 10 is for describing the arrangement of the combustor 4 according to some embodiments described above.

The method of assembling a gas turbine according to an embodiment is a method of assembling the gas turbine 1 according to some embodiments described above. The method of assembling a gas turbine according to some embodiments includes a step S10 of arranging a plurality of the combustors 4 according to some embodiments described above in the circumferential direction of the gas turbine 1 inside the casing 20 of the gas turbine 1.

In the arranging step S10, as depicted in FIG. 7 for instance, the plurality of gas turbine combustors 4 are arranged such that, in the two gas turbine combustors 4 disposed adjacent in the circumferential direction of the gas turbine 1, the region 113 of the pair of second regions 113, 114 of one of the gas turbine combustors 4 and the other region 114 of the pair of second regions 113, 114 of the other one of the two gas turbine combustors 4 are adjacent to one another in the circumferential direction of the gas turbine 1.

Accordingly, the thickness t11 of the acoustic device 100 in the pair of second regions 113, 114 is smaller than the thickness t12 of the acoustic device 100 in the pair of first regions 111, 112, and thus it is easier to ensure the space 40*a* between the combustion cylinders 46 that are adjacent in the circumferential direction of the gas turbine 1. Thus, for the flow of compressed air flowing into the combustion cylinder 46, it is possible to suppress the above described uneven distribution with respect to the position in the circumferential direction of the combustion cylinder. Thus, it is possible to realize the gas turbine combustor 4 capable of suppressing occurrence of combustion oscillation and NOx, for instance.

Embodiments of the present invention were described in detail above, but the present invention is not limited thereto, and various amendments and modifications may be implemented.

For instance, the acoustic device 100 according to some embodiments described above has the pair of first regions 111, 112 positioned at a pair of positions 111A, 112A across the combustion cylinder 46 in the radial direction of the combustion cylinder 46. Nevertheless, the acoustic device 100 according to some embodiments may have only one of the first region 111 at the position 111A of the pair of positions 111A, 112A, or the first region 112 at the other position 112A. If the first regions 111, 112 are disposed at both of the pair of positions 111A, 112A, it is easier to ensure the capacity of the acoustic device 100.

The contents described in the above respective embodiments can be understood as follows, for instance.

(1) According to at least one embodiment of the present disclosure, a gas turbine combustor 4 includes: a combustion cylinder 46; and an acoustic device 100 disposed on an outer circumference of the combustion cylinder 46. The acoustic device 100 has a first region 111, 112 positioned at a downstream side of the combustion cylinder 46, the first region 111, 112 existing at a position which is at least one of a pair of positions across the combustion cylinder 46 in a radial direction of the combustion cylinder 46. The acoustic device 100 has a pair of second regions 113, 114 whose axial-direction position with respect to the combustion cylinder 46 overlaps at least partially with the pair of positions 111A, 112A, and whose circumferential-direction position with respect to the combustion cylinder 46 is different from that of the pair of positions 111A, 112A, the pair of second regions 113, 114 existing at positions across the combustion cylinder 46 in the radial direction. The acoustic device 100 has a third region 120 positioned at the upstream side of first regions 111, 112 and the second regions 113, 114 with respect to the combustion cylinder 46. The thickness t11 of the acoustic device 100 in the radial direction in the pair of second regions 113, 114 is smaller than the thickness t12 of the acoustic device 100 in the radial direction in the first regions 111, 112. The thickness t20 of the acoustic device 100 in the radial direction in the third region 120 is larger than the thickness t11 of the acoustic device 100 in the radial direction in the pair of second regions 113, 114.

With the above configuration (1), in a case where the plurality of gas turbine combustors 4 are arranged in the circumferential direction of the gas turbine 1, by arranging the plurality of gas turbine combustors 4 such that the pair of second regions 113, 114 are positioned along the circumferential direction of the gas turbine 1, it is easier to ensure the space 40*a* between the combustion cylinders 46 adjacent in the circumferential direction of the gas turbine 1, since the thickness t11 of the acoustic device 100 in the pair of second regions 113, 114 is smaller than the thickness t12 of the acoustic device 100 in the first region 111, 112. Thus, it is possible to suppress the above described uneven distribution of the flow of compressed air flowing into the combustion cylinder 46 with respect to the position in the circumferential direction of the combustion cylinder 46. Thus, it is possible to realize the gas turbine combustor 4 capable of suppressing occurrence of combustion oscillation and NOx, for instance.

(2) In some embodiments, in the above configuration (1), the first region 111, 112 preferably exists at both of the pair of positions 111A, 112A.

With the above configuration (2), it is easier to ensure the capacity of the acoustic device 100.

(3) In some embodiments, in the above configuration (1) or (2), the combustion cylinder 46 has an injection part 46*e* forming an injection port 46*d* for combustion gas formed at an end portion at the downstream side. The center axis AXc of the combustion cylinder 46 has the first center axis AXc1 at the upstream side of the combustion cylinder 46 and the second center axis AXc2 at the injection part 46*e*, which extend in different directions. The first region 111, 112 may preferably intersect with the first virtual plane Pv1 including the first center axis AXc1 and the second center axis AXc2. The pair of second regions 113, 114 may preferably intersect with the second virtual plane Pv2 including the first center axis AXc1 and intersecting orthogonally with the first virtual plane Pv1.

In a case where the plurality of gas turbine combustors 4 having the above configuration (3) are arranged in the circumferential direction of the gas turbine 1, by arranging the plurality of gas turbine combustors 4 such that the pair of second regions 113, 114 are positioned along the circumferential direction of the gas turbine 1, it is easier to ensure the space 40*a* between the combustion cylinders 46 adjacent to one another in the circumferential direction of the gas turbine 1 as described above. Furthermore, in a case where the gas turbine combustors 4 are arranged as described above, the region 111 and the other region 112 of the first regions 111, 112 having a larger thickness t12 in the radial direction than the thickness t11 in the radial direction in the pair of second regions 113, 114 are arranged in the radial direction of the gas turbine 1. Thus, between, the first regions 111, 112 are less likely to interfere with one another between the gas turbine combustors 4 adjacent in the circumferential direction of the gas turbine 1, and thus it is easier to ensure the capacity of the first regions 111, 12.

(4) In some embodiments, in any one of the above configurations (1) to (3), at least a part of at least one of the pair of second regions 113, 114 may be preferably disposed at the outer side, in the radial direction of the combustion cylinder, of a line segment Lf connecting two end portions positioned across the at least one of the pair of second regions 113, 114, of the end portions 100*b* of the outer surface 100*a* in the first region 111, 112, in the circumferential direction of the combustion cylinder 46, when seen along the first center axis AXc1 at the upstream side of the combustion cylinder 46, of the center axis AXc of the combustion cylinder 46.

In a case where the plurality of gas turbine combustors 4 having the above configuration (4) are arranged in the circumferential direction of the gas turbine 1, by arranging the plurality of gas turbine combustors 4 such that the pair of second regions 113, 114 are positioned along the circumferential direction of the gas turbine 1, the direction of arrangement of the region 111 and the other region 112 of the pair of first regions 111, 112 become closer to the radial direction of the gas turbine 1. With the above configuration (4), the end portion 100*b* does not protrude further in the circumferential direction than the most protruding portion of one of the pair of second regions 113, 114 protruding in the circumferential direction of the gas turbine 1. Thus, it is possible to suppress the size of the first regions 111, 112 along the circumferential direction, and thus the first regions 111, 112 are less likely to interfere with one another between gas turbine combustors 4 that are adjacent in the circumferential direction of the gas turbine 1.

(5) In some embodiments, in any one of the above configurations (1) to (4), at least one of a region 113 or the other region 114 of the pair of second regions 113, 114 preferably has a greater size Lc in the circumferential direction of the combustion cylinder than a size Lax in an axial direction of the combustion cylinder 46.

With the above configuration (5), it is possible to increase the distance between adjacent combustors 4 compared to a case where the size Lc in the circumferential direction of the combustion cylinder 46 is smaller than the size Lax in the axial direction of the combustion cylinder 46, while ensuring the capacity of the acoustic device 100 in the pair of second regions 113, 114.

(6) In some embodiments, in any one of the above configurations (1) to (5), a part of the third region 120 may overlap with at least a part of the pair of second regions 113, 114 in the circumferential direction.

As described above, even if the third region 120 positioned at the upstream side of the combustion cylinder 46 compared to the pair of first regions 111, 112 and the pair of second regions 113, 114 overlaps with at least a part of the pair of second regions 113, 114 in the circumferential direction as in the above configuration (6), the flow of compressed air passing through the space 40*a* between the adjacent combustion cylinders 46 is not much affected. Furthermore, if the third region 120 positioned at the upstream side of the combustion cylinder 46 compared to the first regions 111, 112 and the pair of second regions 113, 114 is allowed to overlap with at least a part of the pair of second regions 113, 114 in the circumferential direction as described in the above configuration (6), it is easier to ensure the capacity of the acoustic device 100 in the third region 120.

(7) In some embodiments, in any one of the above configurations (1) to (6), the thickness t12, in the radial direction, of the acoustic device 100 in the first regions 111, 112 is preferably not smaller than twice the thickness t11, in the radial direction, of the acoustic device 100 in the second regions 113, 114.

With the above configuration (7), by setting a larger difference between the thickness t12 of the acoustic device 100 in the radial direction in the pair of first regions 111, 112 and the thickness t11 of the acoustic device 100 in the radial direction in the second regions 113, 114, it is possible to increase the distance between the adjacent combustors 4 while ensuring the capacity of the acoustic device 100.

(8) In some embodiments, in any one of the above configurations (1) to (7), the acoustic device 100 may further include a fourth region 130 positioned at the upstream side of the third region 120 with respect to the combustion cylinder 46, the fourth region 130 having a different existence range from the third region 120 in the circumferential direction of the combustion cylinder 46. The thickness t30, in the radial direction, of the acoustic device 100 in the fourth region 130 is preferably larger than the thickness t11, in the radial direction, of the acoustic device 100 in the pair of second regions 113, 114.

As described above, the distance between the combustion cylinders 46 disposed adjacent in the circumferential direction of the gas turbine 1 tends to become greater toward the upstream side of the combustion cylinder 46. Thus, providing the fourth region 130 at the upstream side of the third region 120 has less influence on the flow of compressed air passing through the space 40*a* between the adjacent combustion cylinders 46.

With the above configuration (8), it is possible to suppress influence on the flow of compressed air passing through the space 40*a* between the adjacent combustion cylinders 46, while ensuring the capacity of the acoustic device 100.

(9) In some embodiments, in any one of the above configurations (1) to (8), the acoustic device 100 may preferably include a plurality of resonance chambers 160 independent from one another. The at least one resonance chamber 160 may be disposed over the first region 111, 112, and the third region 120.

With the above configuration (9), by providing the resonance chamber 160 over the first regions 111, 112 and the third region 120, it is easier to ensure the capacity of the resonance chamber 160.

(10) In some embodiments, in any one of the above configurations (1) to (9), the acoustic device 100 preferably includes an inner acoustic device 101 disposed at the inner side in the radial direction of the combustion cylinder 46 and an outer acoustic device 103 other than the inner acoustic device 101 disposed at least partially at the outer side of the inner acoustic device 101 in the radial direction of the combustion cylinder 46.

With the above configuration (10), for instance, in a case where different functions are assigned to the inner acoustic device 101 and the outer acoustic device 103, such as attenuating combustion oscillation of different frequencies, a function that can be effective with a relatively small capacity may be assigned to the inner acoustic device 101 positioned at the inner side in the radial direction, which is likely to have a smaller capacity. Furthermore, for instance, a function that requires a relatively large capacity may be assigned to the outer acoustic device 103 positioned at the outer side in the radial direction, which is capable of having a larger capacity. That is, with the above configuration (10), it is easier to set functions to be assigned to the inner acoustic device 101 and the outer acoustic device 103 reasonably from the perspective of capacity.

(11) In some embodiments, in the above configuration (10), preferably, the inner acoustic device 101 exists and the outer acoustic device 103 does not exist in the pair of second regions 113, 114 and the inner acoustic device 101 and the outer acoustic device 103 exist in the first region 111, 112.

With the above configuration (11) it is possible to easily set the thickness t11 of the acoustic device 100 in the pair of second regions 113, 114 to be smaller than the thickness t12 of the acoustic device 100 in the first region 111, 112.

(12) In some embodiments, in the above configuration (10) or (11), each of the inner acoustic device 101 and the outer acoustic device 103 may preferably include at least one resonance chamber 160.

With the above configuration (12), it is possible to assign different functions to the inner acoustic device 101 and the outer acoustic device 103, such as attenuating combustion oscillation of different frequencies.

(13) In some embodiments, in the above configuration (12), the at least one resonance chamber 160 may be preferably disposed over the first regions 111, 112, and the third region 120.

With the above configuration (13), by providing the resonance chamber 160 over the first regions 111, 112 and the third region 120, it is easier to ensure the capacity of the resonance chamber 160.

(14) In some embodiments, in any one of the above configurations (10) to (13), the inner acoustic device 101 preferably constitutes an acoustic liner 201, and the outer acoustic device 103 constitutes an acoustic damper 203.

The acoustic liner 201 is an acoustic device 100 capable of reducing oscillation of a relatively high frequency caused by combustion oscillation, and the acoustic damper 203 is an acoustic device 100 capable of reducing oscillation of a relatively low frequency caused by combustion oscillation. Thus, the acoustic damper 203 requires a relatively larger resonance space than the acoustic liner 201.

Thus, the acoustic liner 201 capable of exerting an effect even with a relatively small capacity is preferably assigned to the inner acoustic device 101 positioned at the inner side in the radial direction, which tends to have a smaller capacity. Furthermore, for instance, the acoustic damper 203 that requires a relatively large capacity is preferably assigned to the outer acoustic device 103 positioned at the outer side in the radial direction, which is capable of having a larger capacity.

That is, with the above configuration (14), it is possible to set functions to be assigned to the inner acoustic device 101 and the outer acoustic device 103 reasonably from the perspective of capacity.

(15) In some embodiments, in any one of the above configurations (1) to (14), the acoustic device 100 may further include a connection member 180 connecting an end surface 150*a*, in the circumferential direction of the combustion cylinder 46, of the acoustic device 100 in the first region 111, 112 and an outer circumferential surface 100*a* of the acoustic device 100 in the pair of second regions 113, 114.

With the above configuration (15), the connection member 180 connects the end surface 150*a* of the acoustic device 100 in the first region 111, 112 and the outer circumferential surface (outer surface 100*a*) of the acoustic device 100 in the pair of second regions 113, 114, and thus it is possible to suppress lateral oval deformation of the combustion cylinder 46 described above.

(16) In some embodiments, in the above configuration (15), the connection member 180 preferably includes at least one plate member 181 disposed such that the thickness direction is along the axial direction of the combustion cylinder 46.

With the above configuration (16), it is possible to suppress lateral oval deformation of the combustion cylinder 46 described above, with a member having a plate-shape that is a relatively simple shape.

(17) In some embodiments, in the above configuration (15) or (16), the connection member 180 may include at least one second plate member 182 whose plate surface extends in the axial direction of the combustion cylinder 46. The second plate member 182 preferably connects the end surface 150*a*, in the circumferential direction of the combustion cylinder 46, of the acoustic device 100 in the first regions 111, 112 and the outer circumferential surface 100*a* of the acoustic device 100 in the pair of second regions 113.

With the above configuration (17), it is possible to suppress lateral oval deformation of the combustion cylinder 46 described above, with a member having a plate-shape that is a relatively simple shape. Furthermore, with the above configuration (17), it is possible to suppress turbulence of the flow of compressed air flowing in a direction connecting the region 111 and the other region 112 of the pair of first regions 111, 112 along the outer circumferential surface 100*a* of the acoustic device 100 in the pair of second regions 113, 114.

(18) In some embodiments, in the above configuration (15), the connection member 180 may include at least one second plate member 182 and at least one first plate member 181 described below. Herein, the second plate member 182 is preferably a plate member having a plate whose surface extends in the axial direction of the combustion cylinder 46. The first plate member 181 is preferably a plate member disposed in a region surrounded by the second plate member 182, the end surface 150*a* of the acoustic device 100 in the first region 111, 112 with respect to the circumferential direction of the combustion cylinder 46, and the outer circumferential surface 100*a* of the acoustic device 100 in the pair of second regions 113, 114, such that a plate thickness direction is along the axial direction of the combustion cylinder 46.

With the above configuration (18), the first plate member 181 has the same advantageous effect as that of the above configuration (16), and the second plate member 182 has the same advantageous effect as the above configuration (17). Furthermore, with the above configuration (18) the first plate member 181 is disposed in a region surrounded by the second plate member 182, the end surface 150*a* of the acoustic device 100 in the first regions 111, 112, and the outer circumferential surface 100*a* of the acoustic device 100 in the pair of second regions 113, 114, and thus it is possible to suppress influence of the first plate member 181 on the flow of compressed air flowing in a direction that connects the region 111 and the other region 112 of the first regions 111, 112 along the outer circumferential surface 100*a* of the acoustic device 100 in the pair of second regions 113, 114.

(19) In some embodiments, in any one of the above configurations (1) to (18), the thickness of the plate member 153 having the end surface 150*a*, in the circumferential direction of the combustion cylinder 46, of the acoustic device 100 in the first regions 111, 112 is preferably greater than the thickness of the plate member 156 having the outer circumferential surface 100*a* of the acoustic device 100 in the pair of first regions 111, 112.

With the above configuration (19), by increasing the thickness of the plate member 153 having the end surface 150*a*, it is possible to suppress lateral oval deformation of the combustion cylinder 46 described above.

(20) According to at least one embodiment of the present disclosure, the gas turbine 1 includes a plurality of the gas turbine combustors 4 according to any one of the above (1) to (19). The plurality of gas turbine combustors 4 are arranged in the circumferential direction of the gas turbine 1. Two of the gas turbine combustors 4 which are adjacent in the circumferential direction of the gas turbine 1 are arranged such that a region 113 of the pair of second regions 113, 114 of one of the two gas turbine combustors 4 is adjacent to the other region 114 of the pair of second regions 113, 114 of the other one of the two gas turbine combustors 4 in the circumferential direction of the gas turbine 1.

With the above configuration (20), it is possible to increase the distance between the two gas turbine combustors 4. Thus, it is possible to suppress the above described uneven distribution of the flow of compressed air flowing into the combustion cylinder 46 with respect to the position in the circumferential direction of the combustion cylinder 46. Thus, it is possible to realize the gas turbine 1 capable of suppressing occurrence of combustion oscillation and NOx, for instance.

(21) In some embodiments, in the above configuration (20), the plurality of gas turbine combustors 4 include first to third gas turbine combustors 4A, 4B, 4C arranged sequentially in the circumferential direction of the gas turbine 1. In the second gas turbine combustor 4B, the second point P2 is defined as a point which exists within a range in the axial direction of the second gas turbine combustor 4B where the pair of second regions 113, 114 exist, and on the center axis AXc (the first center axis AXc1) of the second gas turbine combustor 4B. In the first gas turbine combustor 4A, the first point P1 is defined as a point which exists within a range in the axial direction of the first gas turbine combustor 4A where the pair of second regions 113, 114 exist, and on the center axis AXc (the first center axis AXc1) of the first gas turbine combustor 4A, the point having the same axial-direction position as the second point P2 of the second gas turbine combustor 4B. In the third gas turbine combustor 4C, the third point P3 is defined as a point which exists within a range in the axial direction of the third gas turbine combustor 4C where the pair of second regions 113, 114 exist, and on the center axis AXc (the first center axis AXc1) of the third gas turbine combustor 4C, the point having the same axial-direction position as the second point P2 of the second gas turbine combustor 4B. The first tangent plane Pt1 is defined as the tangent plane to the outer surface 113*a*, 114*a* of the second gas turbine combustor 4B in the pair of second regions 113, 114 contacting with the outer surface 113*a*, 114*a* at an intersection position CP where the first line segment Lv1 connecting the second point P2 and the first point P1 and the outer surface 113*a*, 114*a* intersect between the second point P2 and the first point P1. The second tangent plane Pt2 is defined as the tangent plane to the outer surface 113*a*, 114*a* of the second gas turbine combustor 4B in the pair of second regions 113, 114 contacting with the outer surface 113*a*, 114*a* at an intersection position CP where the second line segment Lv2 connecting the second point P2 and the third point P3 and the outer surface 113*a*, 114*a* intersect between the second point P2 and the third point P3.

The first regions 111, 112 of the second gas turbine combustor 4B may preferably exist between the first tangent plane Pt1 and the second tangent plane Pt2.

With the above configuration (21), it is possible to suppress the size of the first regions 111, 112 along the circumferential direction of the gas turbine 1, and thus the first regions 111, 112 are less likely to interfere with one another between the gas turbine combustors 4 that are adjacent to one another in the circumferential direction of the gas turbine 1.

(22) According to at least one embodiment of the present disclosure, a method of assembling the gas turbine includes a step S10 of arranging a plurality of the combustors 4 having the configuration of any one of the above (1) to (19) in the circumferential direction of the gas turbine 1 inside the casing 20 of the gas turbine 1. The step S10 of arranging includes arranging the plurality of gas turbine combustors 4 such that, for two of the gas turbine combustors 4 which are adjacent in the circumferential direction of the gas turbine 1, a region 113 of the pair of second regions 113, 114 of one of the gas turbine combustors 4 and the other region 114 of the pair of second regions 113, 114 of the other one of the gas turbine combustors 4 are adjacent in the circumferential direction of the gas turbine 1.

With the above method (22), the thickness t11 of the acoustic device 100 in the pair of second regions 113, 114 is smaller than the thickness t12 of the acoustic device 100 in the first regions 111, 112, and thus it is easier to ensure the space 40*a* between the combustion cylinders 46 that are adjacent in the circumferential direction of the gas turbine 1. Thus, it is possible to suppress the above described uneven distribution of the flow of compressed air flowing into the combustion cylinder 46 with respect to the position in the circumferential direction of the combustion cylinder. Thus, it is possible to realize the gas turbine combustor 4 capable of suppressing occurrence of combustion oscillation and NOx, for instance.

REFERENCE SIGNS LIST

1 Gas turbine
4 Gas turbine combustor (combustor)
46 Combustion cylinder (combustor liner)
100 Acoustic device
101 Inner acoustic device
103 Outer acoustic device
111, 112 First region
113, 114 Pair of second regions

120 Third region
130 Fourth region
160 Resonance chamber (resonance space)
180 Connection member
181 First plate member
182 Second plate member
201 Acoustic liner
203 Acoustic damper

The invention claimed is:

1. A gas turbine combustor, comprising:
a combustion cylinder; and
an acoustic device disposed on an outer circumference of the combustion cylinder, wherein the acoustic device includes:
a first region positioned at a downstream side of the combustion cylinder, the first region existing at a position which is at least one of a pair of positions across the combustion cylinder in a radial direction of the combustion cylinder;
a pair of second regions whose axial-direction position with respect to the combustion cylinder overlaps at least partially with the pair of positions of the first region, and whose circumferential-direction position with respect to the combustion cylinder is different from that of the pair of positions of the first region, the pair of second regions existing at positions across the combustion cylinder in the radial direction; and
a third region positioned at an upstream side of the first region and the second region with respect to the combustion cylinder,
wherein a thickness of the acoustic device in the radial direction in the pair of second regions is smaller than a thickness of the acoustic device in the radial direction in the first region, and
wherein a thickness of the acoustic device in the radial direction in the third region is greater than the thickness of the acoustic device in the radial direction in the pair of second regions.

2. The gas turbine combustor according to claim 1,
wherein the first region exists at both of the pair of positions.

3. The gas turbine combustor according to claim 1,
wherein the combustion cylinder has an injection part forming an injection port of combustion gas formed on an end portion at the downstream side,
wherein a center axis of the combustion cylinder includes a first center axis at the upstream side of the combustion cylinder and a second center axis at the injection part, the first center axis and the second center axis extending in different directions,
wherein the first region intersects with a first virtual plane including the first center axis and the second center axis, and
wherein the pair of second regions intersect with a second virtual plane which includes the first center axis and intersects orthogonally with the first virtual plane.

4. The gas turbine combustor according to claim 1,
wherein at least a part of at least one of the pair of second regions exists at an outer side, in the radial direction of the combustion cylinder, of a line segment connecting two end portions positioned across the at least one second region, of end portions of an outer surface of the first region in the circumferential direction of the combustion cylinder, when seen along a first center axis at the upstream side of the combustion cylinder, of the center axis of the combustion cylinder.

5. The gas turbine combustor according to claim 1, wherein at least one region of the pair of second regions has a greater size in the circumferential direction of the combustion cylinder than a size in an axial direction of the combustion cylinder.

6. The gas turbine combustor according to claim 1,
wherein a part of the third region overlaps with at least a part of the pair of second regions in a circumferential direction of the combustion cylinder.

7. The gas turbine combustor according to claim 1, wherein the thickness, in the radial direction, of the acoustic device in the first region is not smaller than twice the thickness, in the radial direction, of the acoustic device in the pair of second regions.

8. The gas turbine combustor according to claim 1, further comprising
a fourth region positioned at the upstream side of the third region, the fourth region having a different existence range from the third region in a circumferential direction of the combustion cylinder,
wherein a thickness of the acoustic device along the radial direction in the fourth region is greater than the thickness, in the radial direction, of the acoustic device in the pair of second regions.

9. The gas turbine combustor according to claim 1,
wherein the acoustic device has a plurality of resonance chambers independent from one another, and
wherein at least one of the resonance chambers is disposed over the first region and the third region.

10. The gas turbine combustor according to claim 1,
wherein the acoustic device includes an inner acoustic device disposed at an inner side in the radial direction of the combustion cylinder and an outer acoustic device other than the inner acoustic device, the outer acoustic device being disposed at least partially at an outer side of the inner acoustic device in the radial direction of the combustion cylinder.

11. The gas turbine combustor according to claim 10,
wherein the inner acoustic device exists and the outer acoustic device does not exist in the pair of second regions, and
wherein the inner acoustic device and the outer acoustic device exist in the first region.

12. The gas turbine combustor according to claim 10,
wherein the inner acoustic device and the outer acoustic device each have at least one resonance chamber.

13. The gas turbine combustor according to claim 12,
wherein the at least one resonance chamber of the outer acoustic device is disposed over the first region and the third region.

14. The gas turbine combustor according to claim 10,
wherein the inner acoustic device constitutes an acoustic liner, and
wherein the outer acoustic device constitutes an acoustic damper.

15. The gas turbine combustor according to claim 1,
further comprising a connection member connecting an end surface, in a circumferential direction of the combustion cylinder, of the acoustic device in the first region and an outer circumferential surface of the acoustic device in the pair of second regions.

16. The gas turbine combustor according to claim 15,
wherein the connection member includes at least one first plate member disposed such that a plate thickness direction is along an axial direction of the combustion cylinder.

17. The gas turbine combustor according to claim 15, wherein the connection member includes at least one second plate member having a plate surface which extends in an axial direction of the combustion cylinder, and wherein the second plate member connects at least the end surface, in the circumferential direction of the combustion cylinder, of the acoustic device in the first region and the outer circumferential surface of the acoustic device in the pair of second regions.

18. The gas turbine combustor according to claim 15, wherein the connection member includes:

at least one second plate member having a plate surface which extends in an axial direction of the combustion cylinder; and at least one first plate member disposed in a region surrounded by the second plate member, the end surface of the acoustic device in the first region with respect to the circumferential direction of the combustion cylinder, and the outer circumferential surface of the acoustic device in the pair of second regions, such that a plate thickness direction is along the axial direction of the combustion cylinder.

19. The gas turbine combustor according to claim 1, wherein a thickness of a plate member including an end surface, in a circumferential direction of the combustion cylinder, of the acoustic device in the first region is greater than a thickness of a plate member having an outer circumferential surface of the acoustic device in the first region.

20. A gas turbine including a plurality of the gas turbine combustors according to claim 1, wherein the plurality of gas turbine combustors are arranged in a circumferential direction of the gas turbine, and wherein two of the gas turbine combustors which are adjacent in the circumferential direction of the gas turbine are arranged such that a region of the pair of second regions of one of the two gas turbine combustors is adjacent to the other region of the pair of second regions of the other one of the two gas turbine combustors in the circumferential direction of the gas turbine.

21. The gas turbine combustor according to claim 20, wherein the plurality of gas turbine combustors include a first gas turbine combustor, a second gas turbine combustor, and a third gas turbine combustor arranged sequentially in the circumferential direction of the gas turbine, and wherein, when, in the second gas turbine combustor, a second point is defined as a point which exists within a range in an axial direction of the second gas turbine combustor where the pair of second regions exist, and on a center axis of the second gas turbine combustor, in the first gas turbine combustor, a first point is defined as a point which exists within a range in an axial direction of the first gas turbine combustor where the pair of second regions exist, and on a center axis of the first gas turbine combustor, the first point having a same axial-direction position as the second point of the second gas turbine combustor, in the third gas turbine combustor, a third point is defined as a point which exists within a range in an axial direction of the third gas turbine combustor where the pair of second regions exist, and on a center axis of the third gas turbine combustor, the third point having a same axial-direction position as the second point of the second gas turbine combustor, a first tangent plane is defined as a tangent plane to an outer surface of the second gas turbine combustor in the pair of second regions contacting with the outer surface at an intersection position where a first line segment connecting the second point and the first point and the outer surface intersect between the second point and the first point, and a second tangent plane is defined as a tangent plane to the outer surface of the second gas turbine combustor in the pair of second regions contacting with the outer surface at an intersection position where a second line segment connecting the second point and the third point and the outer surface intersect between the second point and the third point, the first region of the second gas turbine combustor exists between the first tangent plane and the second tangent plane.

22. A method of assembling a gas turbine, comprising:

a step of arranging a plurality of the gas turbine combustors according to claim 1 inside a casing of the gas turbine in a circumferential direction of the gas turbine, wherein the step of arranging includes arranging the plurality of gas turbine combustors such that, among two of the gas turbine combustors which are adjacent to one another in the circumferential direction of the gas turbine, a region of the pair of second regions of one of the gas turbine combustors and the other region of the pair of second regions of the other one of the gas turbine combustors are adjacent to one another in the circumferential direction of the gas turbine.

* * * * *